United States Patent [19]

Grass et al.

[11] Patent Number: 5,373,411

[45] Date of Patent: Dec. 13, 1994

[54] REMOTE CONTROL CIRCUIT BREAKER SYSTEM

[75] Inventors: William E. Grass, Milwaukee; Herbert R. Streich, Whitefish Bay; Robert J. Clarey, Brookfield; Peter K. Moldovan, Cascade, all of Wis.

[73] Assignee: Eaton Corporation, Cleveland, Ohio

[21] Appl. No.: 997,299

[22] Filed: Dec. 23, 1992

Related U.S. Application Data

[63] Continuation-in-part of Ser. No. 768,029, Sep. 30, 1991, Pat. No. 5,301,083.

[51] Int. Cl.⁵ .................................. H02H 3/08
[52] U.S. Cl. .......................... 361/64; 361/115; 361/81; 364/492
[58] Field of Search .............. 361/87, 115, 64, 68, 361/66, 81; 335/14, 20; 364/492, 483; 340/825.06

[56] References Cited

U.S. PATENT DOCUMENTS

| Re. 33,325 | 9/1990 | Yokoyama et al. | 335/14 |
|---|---|---|---|
| 3,081,386 | 3/1963 | Koenig et al. | 335/9 |
| 4,164,719 | 8/1979 | Young et al. | 335/14 |
| 4,167,716 | 9/1979 | Horn | 335/14 |
| 4,178,572 | 12/1979 | Gaskill et al. | 335/14 |
| 4,419,665 | 12/1983 | Gurr et al. | 340/825.06 |
| 4,434,413 | 2/1984 | Pelletier et al. | 337/71 |
| 4,529,951 | 7/1985 | Youichi et al. | 335/13 |
| 4,531,172 | 7/1985 | Mertz | 361/13 |
| 4,532,486 | 7/1985 | Terrier | 335/13 |
| 4,549,153 | 10/1985 | Forsell et al. | 335/16 |
| 4,616,206 | 10/1986 | Bridges et al. | 337/71 |
| 4,623,859 | 11/1986 | Erickson et al. | 335/14 |
| 4,879,535 | 11/1989 | Mori et al. | 335/14 |
| 4,897,625 | 1/1990 | Yokoyama et al. | 335/14 |
| 4,929,919 | 5/1990 | Link et al. | 335/38 |
| 4,947,145 | 8/1990 | Ohishi et al. | 335/14 |
| 4,964,058 | 10/1990 | Brown, Jr. | 364/492 |
| 4,965,694 | 10/1990 | Dvorak et al. | 361/64 |
| 5,218,552 | 6/1993 | Stirk et al. | 364/492 |

OTHER PUBLICATIONS

Eaton Corporation Cutler-Hammer Publication No. DJ-221-A; 3-10-92.

Primary Examiner—Todd E. DeBoer
Attorney, Agent, or Firm—Andrus, Sceales, Starke & Sawall

[57] ABSTRACT

A remote control residential and commercial circuit breaker system (320) provides overload current protection and load management. The system includes a plurality of remote control circuit breakers (20, 322) each including a switch (188, 190, 150, 152) responsive to a control signal (330) for controllably completing and interrupting a respective load circuit (184), a plurality of pole controllers (336, 338) each responsive to a respective address signal (342, 344) and coupled to a respective circuit breaker and supplying the respective control signal to the respective switch. Each pole controller includes a status circuit responsive to actuation of the switch and supplying a status signal indicative thereof. A common controller (348) is coupled to the pole controllers and supplies addresses signals.

20 Claims, 20 Drawing Sheets

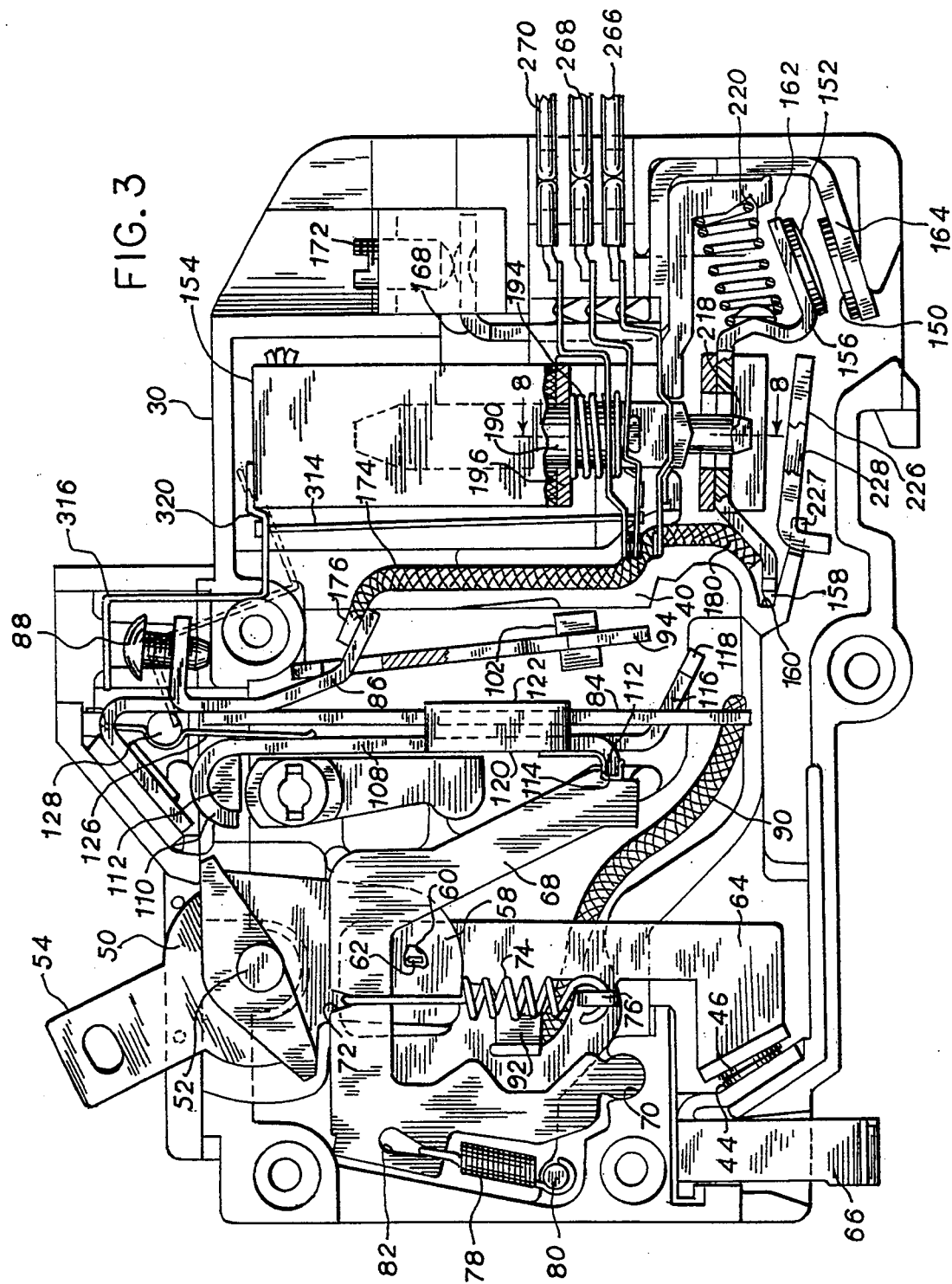

MANUAL "OFF"
(POWER NOT ALLOWED)

AUTOMATIC

MANUAL "ON"
(POWER ALLOWED)

REMOTE CONTROL CIRCUIT BREAKER SYSTEM

CROSS-REFERENCE TO RELATED APPLICATION

This application is a continuation in part of application Ser. No. 07/768,029, filed Sep. 30, 1991, now U.S. Pat. No. 5,301,083, filed Apr. 5, 1994.

BACKGROUND AND SUMMARY

The invention relates to remote control circuit breaker systems.

Circuit breakers provide overcurrent protection for preventing personal injury and property damage. A loadcenter or panelboard receives electrical power from the utility company transformer and routes the electrical power through a main circuit breaker and then through branch circuit breakers to designated branch circuits, each supplying current to one or more electrical loads. The circuit breakers are designed to interrupt the electrical current if it is excessive or outside the design limits of the conductor and loads, to reduce the risk of injury and damage. Branch circuit breakers are provided in narrow width molded cases which fit into designated slots or pole openings in the panelboard. The two most common widths for such circuit breakers are one inch and three-quarter inch, which is the outside width dimension of the molded case.

A circuit breaker has a thermal/magnetic trip characteristic. The thermal characteristic is operative in response to overload current of extended duration which heats a bimetal member, causing movement of the latter, which in turn releases a latch to trip open a set of contacts. For example, the thermal characteristic would respond to 30 amps being drawn in a 15 amp circuit. The magnetic characteristic is operative in response to a sudden high magnitude current overload condition, and uses the magnetic field generated in a magnetic core to attract an armature, which movement releases the latch to open the contacts. As an example, the magnetic type actuation occurs in response to a short circuit wherein the hot line conductor becomes directly connected with ground or neutral, bypassing the load.

It is known in the prior art to provide remote controlled circuit breakers wherein the breaker contacts are tripped to an open condition by an actuator responding to a control signal. This enables the circuit breaker to additionally perform a switching function and manage a load connected to the breaker, such that the breaker performs the dual functions of overload current protection and load management. A disadvantage of using the breaker contacts to perform a switching relay type function is that the breaker contacts are designed to be able to interrupt high current, not for repeated operation.

The invention of the above noted parent application provides a circuit breaker with a first set of contacts provided by a pair of separable overload breaker contacts for overload current protection, and a second set of contacts provided by a pair of switching relay contacts having open and closed conditions and electrically connected in series with the overload breaker contacts and providing load management. Trip structure causes separation of the overload breaker contacts in response to overload currents therethrough. An actuator is energizable to mechanically actuate the switching relay contacts.

In one aspect of the parent invention, feedback circuitry responsive to the actuator provides status indication of the condition of the switching relay contacts, and in turn the managed load.

In another aspect of the parent invention, the noted structure is provided in a common case, and concurrent heating of the case by both the overload current trip structure and a solenoid actuator is prevented. Only one or the other of such trip structure and such solenoid is allowed to heat the case.

In another aspect of the parent invention, structure is provided enabling packaging within a narrow case of standard width of one inch or less. A negative gradient acting spring and particular orientation reduces the holding requirements of an actuating solenoid for the switching relay contacts, which reduced holding requirements enables use of a small solenoid, facilitating the noted packaging. In a further aspect, magnetic flux coupling structure is provided adjacent a movable contact arm of the switching relay contacts and provides a hold down electromagnet holding the switching relay contacts in the closed condition in response to overload currents therethrough such that the switching relay contacts remain closed and resist blow-apart force, and instead the circuit is interrupted by the overload breaker contacts in response to the overload current. The magnetic flux coupling structure providing the hold down electromagnet urges the switching relay contacts to the closed condition with increasing force with increasing current flow therethrough, which in turn reduces the holding requirements of the noted negative gradient acting biasing spring under overload current conditions, which in turn further reduces the holding requirements and size of the actuating solenoid, further facilitating the noted packaging.

The present invention provides an interface between a remote control circuit breaker, such as that of the parent invention, and a system controller of a home automation system. While not limited thereto, the present invention is particularly well adapted for use in a home automation system such as that promoted by SMART HOUSE, L.P. of Upper Marlboro, Md.

The SMART HOUSE system starts with a network of electrical power, communications and audio/video cables installed during construction. It grows through the addition of input sources and a system controller, plus receptacles to communicate with smart gas and electric appliances. Higher levels of automated control and personal customization can be added by the original or subsequent homeowners.

Homeowners will be using hand held remote or wall mounted control panels, touch tone phones, or personal computers to input to the central control system. They will be able to set modes or directly control heating/cooling, light settings, and appliances, as well as built-in equipment. All functions can be turned off or on at programmed times in pre-set house modes like normal work day, weekend, or vacation. Smart appliances now under development will plug into gas or electrical supply outlets equipped with communication ports. They will be able to interact with other appliances and report status to the system controller. Hard wired equipment like heat pumps or exterior lighting can be directly or automatically controlled through special remotely controlled circuit breakers in the power distribution panel or loadcenter.

The present invention provides the interface circuitry between the home automation system controller and the remotely operated power switching devices. The system includes a plurality of remote control circuit breakers each including a switch responsive to a control signal for controllably completing and interrupting a respective load circuit, a plurality of pole controllers each responsive to an address signal and coupled to a respective remote control circuit breaker and supplying the control signal to the switch, each pole controller including a status circuit responsive to actuation of the switch and supplying a status signal indicative thereof, and a common controller coupled to the pole controllers and supplying the address signals. The status signal is generated after generation of the address signal, for confirming actuation of the switch in response to the control signal from the pole controller responding to the address signal.

In one aspect of the invention, the common controller generates a sequence cycle including an address cycle having a plurality of multiplexed address signals, followed by a status cycle having a plurality of multiplexed status symbols, such that status cycles are provided between address cycles. The status cycle begins upon completion of the address cycle, and upon completion of the status cycle, the next address cycle begins.

In another aspect of the invention, the status circuit responds to a given current characteristic of the control signal supplied from the pole controller to the switch in the remote control circuit breaker in response to the address signal, to indicate actuation of the switch and condition of the load circuit. In a particularly desirable aspect, simplified status indication is provided by determining the status of actuation of the switch and the condition of the load circuit solely by the given current characteristic of the control signal from the pole controller, without extra separate connection to the load circuit or switch.

In another aspect, the pole controller includes a manual override switch having a first position overriding the common controller and providing a control signal interrupting the load circuit regardless of any address signal provided by the common controller to the respective pole controller, a second position enabling the control signal to be controlled by the common controller, and a third position overriding the common controller and allowing completion of the load circuit regardless of any address signal provided by the common controller to the respective pole controller. In a particularly desirable aspect, a dual color lamp system is provided, and lamp energizing circuitry responds to the manual override switch and to the common controller and energizes the lamp system such that a first color is flashingly illuminated when the manual override switch is in the first position, the first color is continuously illuminated when the manual override switch is in the second position and the load circuit is interrupted, and a second color is flashingly illuminated when the manual override switch is in the third position, and the second color is continuously illuminated when the manual override switch is in the second position and completion of the load circuit is allowed.

In another aspect, the status circuit supplies a fault status signal when the switch does not actuate in response to the control signal from the respective pole controller, and the lamp energizing circuit responds to the status fault signal and alternately flashes the noted first and second colors.

In another aspect, the invention provides a remote control residential and commercial circuit breaker system affording overload current protection and load management, including a plurality of remote control circuit breakers each having a first set of contacts provided by a pair of separable overload breaker contacts, trip structure for causing separation of the overload breaker contacts in response to overload current therethrough, a second set of contacts provided by a pair of switching relay contacts having open and closed conditions and electrically connected in series with the overload breaker contacts in a respective load circuit, an actuator energizable by a control signal to mechanically actuate the switching relay contacts, a plurality of pole controllers each responsive to an address signal and coupled to a respective actuator and supplying the control signal thereto, each pole controller including a status circuit responsive to a given current characteristic of the control signal to the actuator to indicate the condition of the actuator and the switching relay contacts and supplying a status signal indicative thereof, and a common controller coupled to the pole controllers and supplying the address signals.

Each pole controller performs a number of functions, including energization of the actuator such as a solenoid in the remote control circuit breaker, sensing of actuator or solenoid current for status and feedback confirmation, protection of the actuator, enablement of user selection of a manual off, manual on, or automatic mode, and control of an indicator lamp arrangement.

In another aspect, the invention provides a remote control circuit breaker system including a service center receiving electrical utility power. The service center has a circuit breaker panelboard section, and a plurality of circuit breakers, including remote control circuit breakers, are mounted in the circuit breaker panelboard section, each circuit breaker having a user engageable handle extending forwardly toward and facing the user. Each remote control circuit breaker includes a switch responsive to a control signal for controllably completing and interrupting a respective load circuit. The service center includes a pole controller panel section. A motherboard printed circuit board is mounted in the pole controller panel section and has common controller circuitry and a plurality of connection headers thereon. The common controller circuit supplies address signals through the connection headers. A plurality of pole controllers are mounted in the pole controller panel section. Each pole controller is mounted on the motherboard in plugged-in relation with a respective connection header. Each pole controller has a user engageable handle extending forwardly toward and facing the user. The pole controller comprises a molded insulating case having a rearward connection port with a motherboard interface connector mating with a respective connection header on the motherboard. The case has an opening at the front facing the user. A manual override switch is mounted in the case. The pole controller handle is part of the manual override switch and extends forwardly therefrom through the front opening in the case.

BRIEF DESCRIPTION OF THE DRAWINGS

FIG. 3 is a side elevation view of the structure of FIG. 2.

DETAILED DESCRIPTION

Residential and commercial lighting and appliance branch circuit breakers of the narrow width type are known in the prior art, for example Cutler-Hammer Model 403, commercially available from Cutler-Hammer Products, Eaton Corporation, 4201 North 27th Street, Milwaukee, Wis. 53216, and also for example as shown in U.S. Pat. Nos. 3,081,386, 4,549,153, 4,616,206, and 4,929,919, incorporated herein by reference. Such circuit breakers provide overload current protection. The two most common widths for such circuit breakers are three-quarters inch, and one inch, which is the outside width dimension of the molded case.

Figure 1:
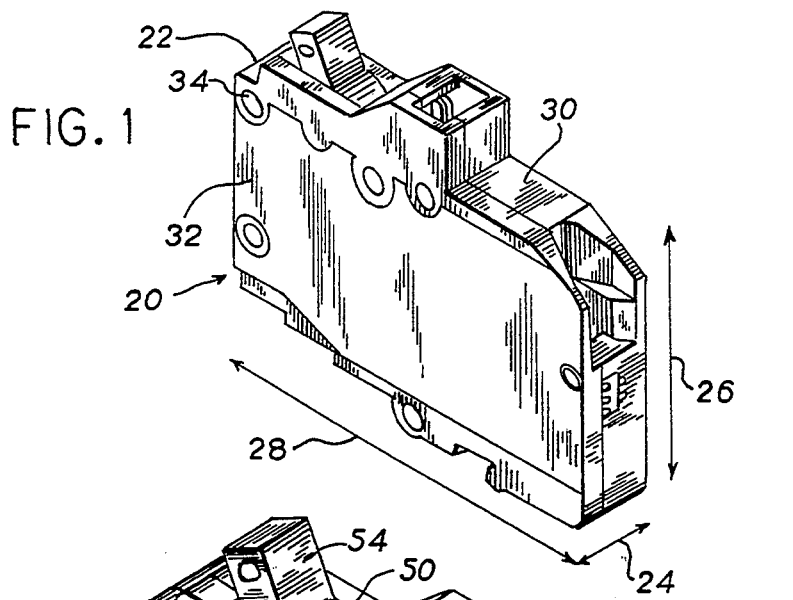
FIG. 1 is a perspective view of a circuit breaker in accordance with the noted parent invention.

FIG. 1 shows a remote control residential and commercial lighting and appliance branch circuit breaker 20 providing overload current protection and also providing load management. The breaker is housed in a molded insulating case 22 having a width 24 of three-quarters inch, a height 26 of three and one-quarter inches, and a length 28 of four inches.

Case 22 includes a rear base portion 30 and a front cover 32 attached to base 30 by rivets 34. The interior of the case has left and right compartments 36 and 38, FIG. 2, separated by a dividing wall 40 extending integrally forwardly from the back wall 42 of base 30. The breaker includes a first set of contacts in the case provided by a pair of separable overload breaker contacts 44, 46 in left compartment 36, and trip structure 48 in left compartment 36 of the case for causing separation of the overload breaker contacts in response to overload currents therethrough. The trip structure is known in the art, for example in the above noted Cutler-Hammer 403 breaker, and will only be briefly described.

A molded insulating operator 50 is rotatably journaled on cylindrical bosses, one of which is shown at 52, received in recesses formed in base 30 and cover 20. Operating handle 54 of operator 50 extends upwardly through opening 56 in the case for external manual operation of the breaker. Operator 50 has a depending leg 58, FIG. 3, extending on the opposite side of its rotational axis from handle 54. Leg 58 is comparable to leg 20b in FIG. 2 of above incorporated U.S. Pat. No. 4,929,919, and has an aperture 60 receiving tab 62 of movable contact arm 64 to pivotally attach movable contact arm 64 to operator 50. Movable contact arm 64 has movable contact 46 mounted thereto for engagement with stationary contact 44 mounted to stationary contact terminal arm and clip 66 at the lower left corner of compartment 36 of the case for external circuit connection to the line side of the circuit, FIG. 13.

Figure 2:
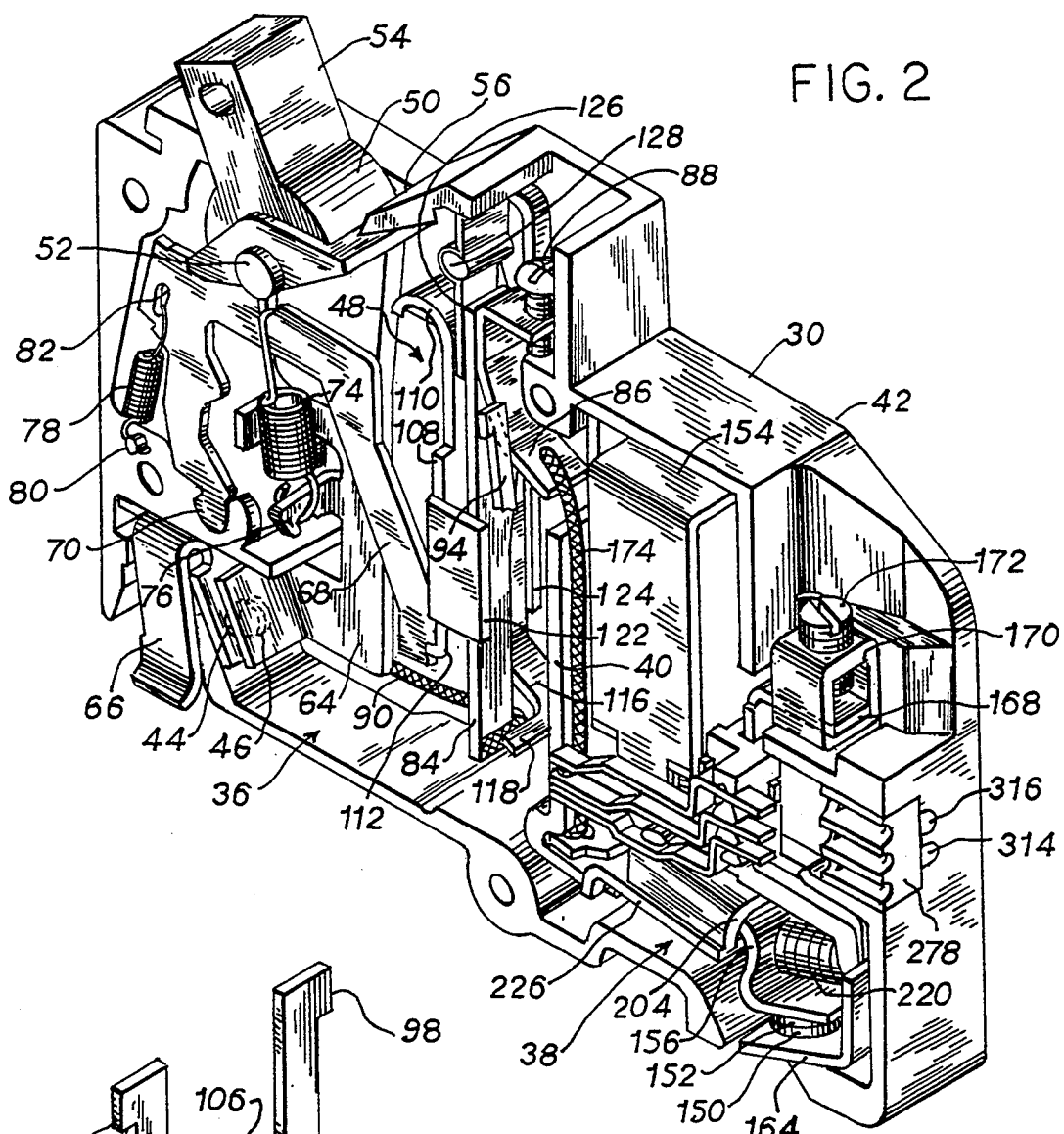
FIG. 2 is an enlarged view like FIG. 1, but with the front cover removed.

A generally inverted U-shaped latch lever 68, comparable to latch lever 22 in FIG. 2 of incorporated U.S. Pat. No. 4,929,919, is pivotally mounted at its left end within a semi-cylindrical recess 70 in base 30. Latch lever 68 has a notch 72 formed approximately centrally thereof which receives the upper hooked end of a spring 74. The opposite bottom hooked end of spring 74 is connected to movable contact arm 64 at tab 76. Spring 74 connects latch lever 68 to movable contact arm 64 under tension, thereby biasing movable contact arm 64 clockwise about its pivotal attachment to operator 50 and biasing latch lever 68 clockwise about the pivot formed at recess 70. In the ON position of the breaker shown in FIG. 3, spring 74 provides contact closing force for breaker contacts 44 and 46. A second helical tension spring 78 is connected between a boss 80 of base 30 and the left leg of latch lever 68 at aperture 82, in opposition to the bias provided by spring 74. Spring 78 operates to automatically reset latch lever 68 and the breaker mechanism after the breaker has tripped and to move handle 54 to the OFF position. When the circuit breaker is in its ON state as shown in FIG. 3, spring 78 is almost fully relaxed, providing little opposing bias to latch lever 68. However, when the circuit breaker trips and latch lever 68 moves in a clockwise direction about pivot 80, spring 78 becomes stretched to provide a reverse or counterclockwise bias to latch lever 68, to be described, thereby urging latch lever 68 back to a reset position.

A current sensing bimetal and magnet structure assembly is located in left compartment 36 and to the right of latch lever 68. A bimetal member 84 is affixed at its upper end such as by welding, soldering, or the like, to a support conductor 86 which is positioned between back wall 42 of base 30 and front cover 32 and includes an adjustment screw 88. By turning screw 88 clockwise, support member 86 rocks counterclockwise, to move the lower end of bimetal member 84 rightwardly. By turning screw 88 counterclockwise, support member 86 rocks clockwise, to move the lower end of bimetal member 84 leftwardly. The adjustable positioning of the lower end of bimetal member 84 in this manner calibrates the predetermined current at which the breaker will trip.

Figure 12:
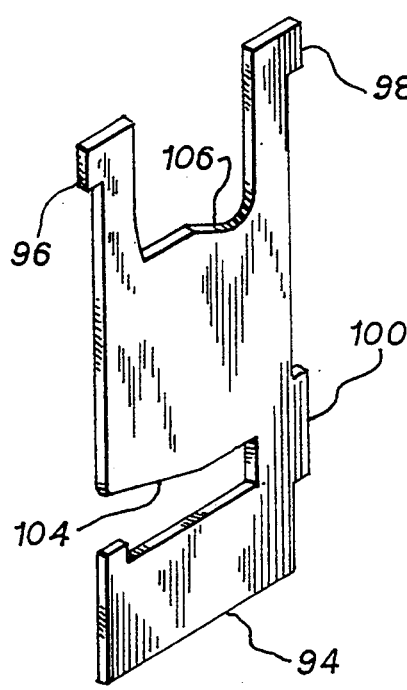
FIG. 12 is a perspective view of one of the components of FIG. 3.

A flexible braided pigtail conductor 90 is affixed at its right end to the lower or free end of bimetal member 84 by soldering, welding, brazing or the like. The opposite left end of pigtail conductor 90 is similarly affixed to movable contact arm 64 at tab 92. The magnetic structure for the breaker includes an elongated pole piece 94, FIGS. 3 and 12, having upper ears 96 and 98 received in recesses in back wall 42 of case 30 and in front cover 32 from which pole piece 94 depends downwardly and swings in an arc as guided and limited by tab 100 in recess 102 in back wall 42 of base 30. The pole piece 94 used is that from ground fault interrupter structure where slots 104 and 106 retain a coil (not shown) wound on the pole piece, which coil is not used in the present implementation. Armature 108 has an upper end 110 hooked around boss 112 of base 30, and a lower end 112 hooked in notch 114 of latch lever 68. Armature 108 has a lower leg 116 extending downwardly and rightwardly behind bimetal 84 and having a forwardly extending tab 118, FIGS. 2 and 3. The central portion 120 of armature 108 is U-shaped in horizontal cross-section and has rightwardly extending forward and rearward legs 122 and 124 straddling bimetal member 84 and extending towards pole piece 94. Leaf spring 126 is hooked around boss 128 of base 30 and biases armature 108 to rock clockwise about boss 112 such that the lower end 112 of armature 108 is biased leftwardly.

In operation, current from a supply source is fed to the breaker through terminal 66 and stationary contact 44 to movable contact 46, movable contact arm 64, pigtail conductor 90, and bimetal member 84 and support conductor 86 for connection to the remainder of the breaker structure, to be described, and then to the branch circuit and load to be protected and managed, and then returned to the power supply. In the event of a prolonged, low grade fault current condition, bimetal member 30 will heat due to the overcurrent, and the lower end of bimetal member 84 will deflect rightwardly and engage tab 118 to pull leg 116 and armature 108 rightwardly thereby pulling lower end 112 of the armature from engagement with notch 114 of latch lever 68. When so released, latch lever 68 pivots clockwise about pivot 70 under the influence of spring 74. Clockwise movement of latch lever 68 carries the upper end of spring 74 across the plane of the pivot provided by tab 62 in aperture 60 in operator 50, to effect counterclockwise movement of movable contact arm 64 about this pivotal connection, thereby separating movable contact 46 from stationary contact 44. This movement of contact arm 64 shortens the operating length of spring 74, relaxing it to a nearly solid condition having its line of action directed to the left of the pivot of the operator, thereby applying a clockwise moment to the operator. Thereafter, spring 78 urges latch lever 68 counterclockwise to its reset position, moving contact arm 68 and spring 74 therewith. Spring 74 then becomes fully relaxed and acts as a solid link to rotate operating handling 54 to a rightward OFF position of the breaker, as shown in dashed line in FIG. 2 of incorporated U.S. Pat. No. 4,929,919.

When bimetal member 84 cools and returns to its original, normal position, the lower end of bimetal member 84 moves back leftwardly away from tab 118, and armature 108 rocks clockwise about boss 112 under the influence of spring 126 such that lower end 112 of armature 108 moves leftwardly into engagement with notch 114, thereby to re-latch the breaker mechanism. Subsequent rotation of operator 50 counterclockwise about pivot 52 to move handle 54 leftwardly to the ON position carries the pivot connection 60, 62 of operator 50 and movable contact arm 64 over-center of the line of action of spring 74, thereby closing movable contact 46 against stationary contact 44.

In the event of a sudden large increase in current flow through the breaker, the magnetic structure takes over to rapidly trip the circuit breaker before the bimetal member 84 has a chance to respond to the increased current. Current flow from pigtail conductor 90 through bimetal member 84 induces a magnetic flux within U-shaped armature central portion 120, thereby to attract pole piece 94 leftwardly until tab 100 is stopped at the left edge of recess 102, whereafter armature 108 is attracted rightwardly toward pole piece 94 to move lower latching end 112 of the armature out of engagement with notch 114, to release latch lever 68 as above described.

Overload breaker contacts 44, 46 and trip structure 48 are in left compartment 36 of case 22 to the left of dividing wall 40, FIGS. 2 and 3. To the right of dividing wall 40 in right compartment 38 of the case is a pair of switching relay contacts 150 and 152, and an actuator 154 energizable to mechanically actuate the switching relay contacts between a normally closed condition, FIGS. 2 and 6, and an open condition, FIG. 3. Contact 152 is a movable contact mounted on a movable contact arm 156 having a left end pivot point 158 pivotally mounted in the case at a bearing recess 160 at the bottom of dividing wall 40. Movable contact 152 is soldered, welded, brazed or the like to the right end of contact arm 156 at a contact engagement point 162. Contact 150 is a stationary contact mounted by soldering, welding, brazing or the like to the lower portion 164 of a stationary terminal 166 having an S-shaped configuration, FIG. 4, with an upper portion 168 in lug 170 having tightening screw 172 for connection to the load side conductor of a branch circuit.

Figure 13:
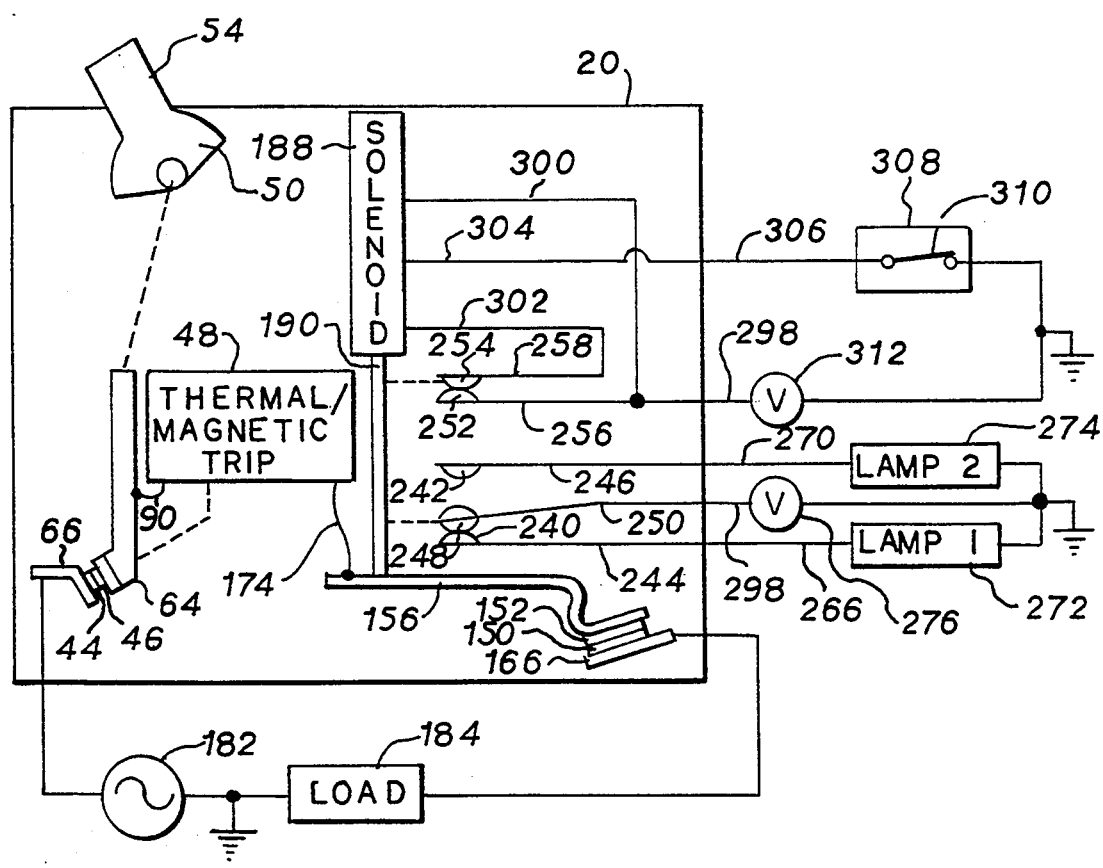
FIG. 13 is a schematic circuit diagram.

A flexible braided pigtail conductor 174 has an upper end 176 affixed by soldering, welding, brazing or the like to support conductor 86 at the upper end of bimetal member 84. Pigtail conductor 174 extends rightwardly through a passage 178, FIG. 4, in the upper portion of dividing wall 40 and then axially vertically downwardly along the right side of dividing wall 40, between dividing wall 40 and actuator 154. The lower end 180 of pigtail conductor 174 is affixed by soldering, welding, brazing or the like to movable contact arm 156 adjacent left end pivot point 158. In this manner, switching relay contacts 150, 152 are electrically connected in series with overload breaker contacts 44, 46. The electric circuit current path, FIGS. 13 and 3, is from the power source 182 to stationary terminal 66 to breaker contacts 44, 46 to movable contact arm 64 to pigtail conductor 90 to bimetal member 84 and support conductor 86 to pigtail conductor 174 to movable contact arm 156 to relay contacts 152, 150 to stationary terminal 166 and to the branch circuit load 184.

Figure 4:
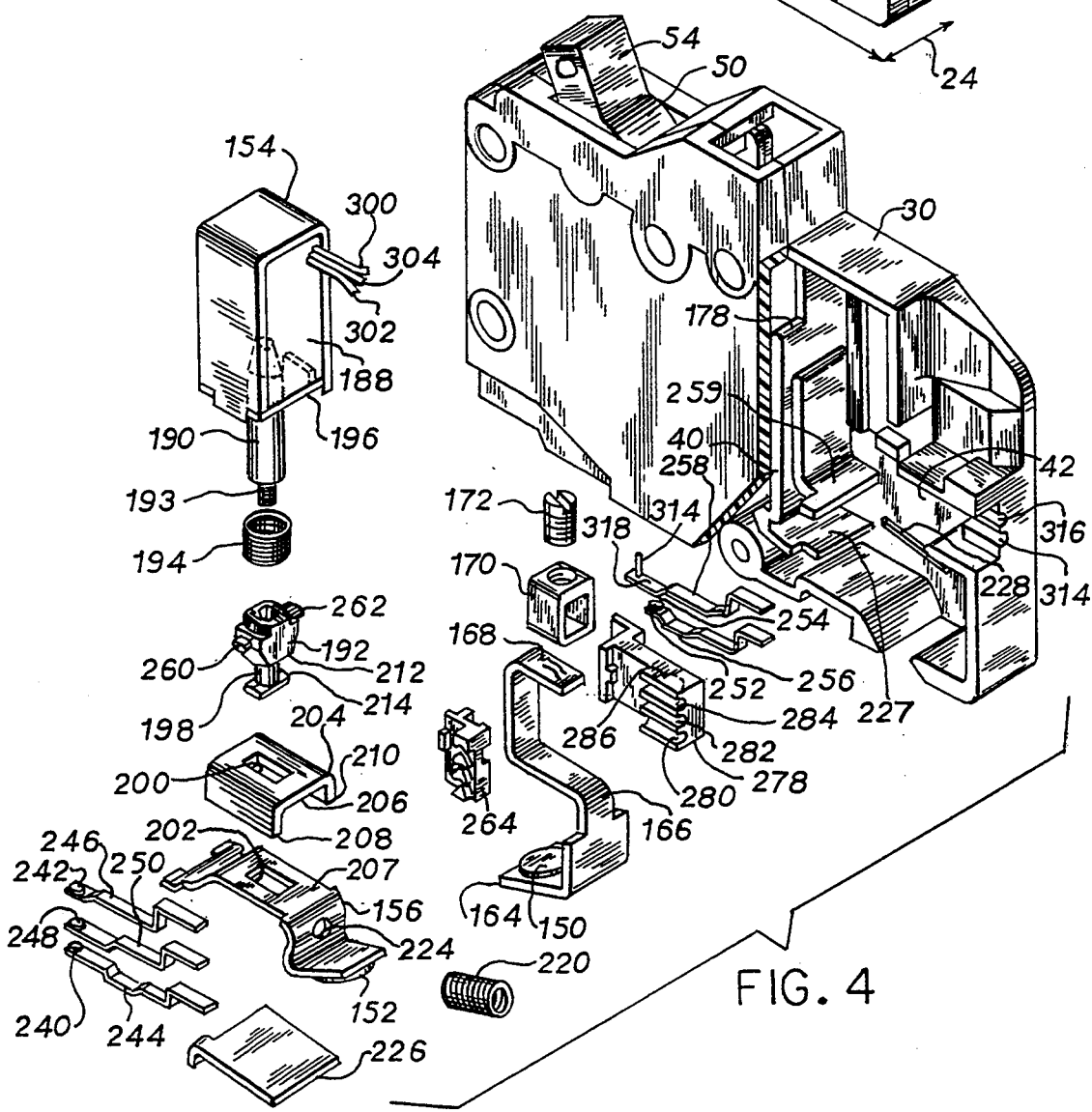
FIG. 4 is an exploded perspective view of a portion of the structure of FIG. 2.
Figure 6:
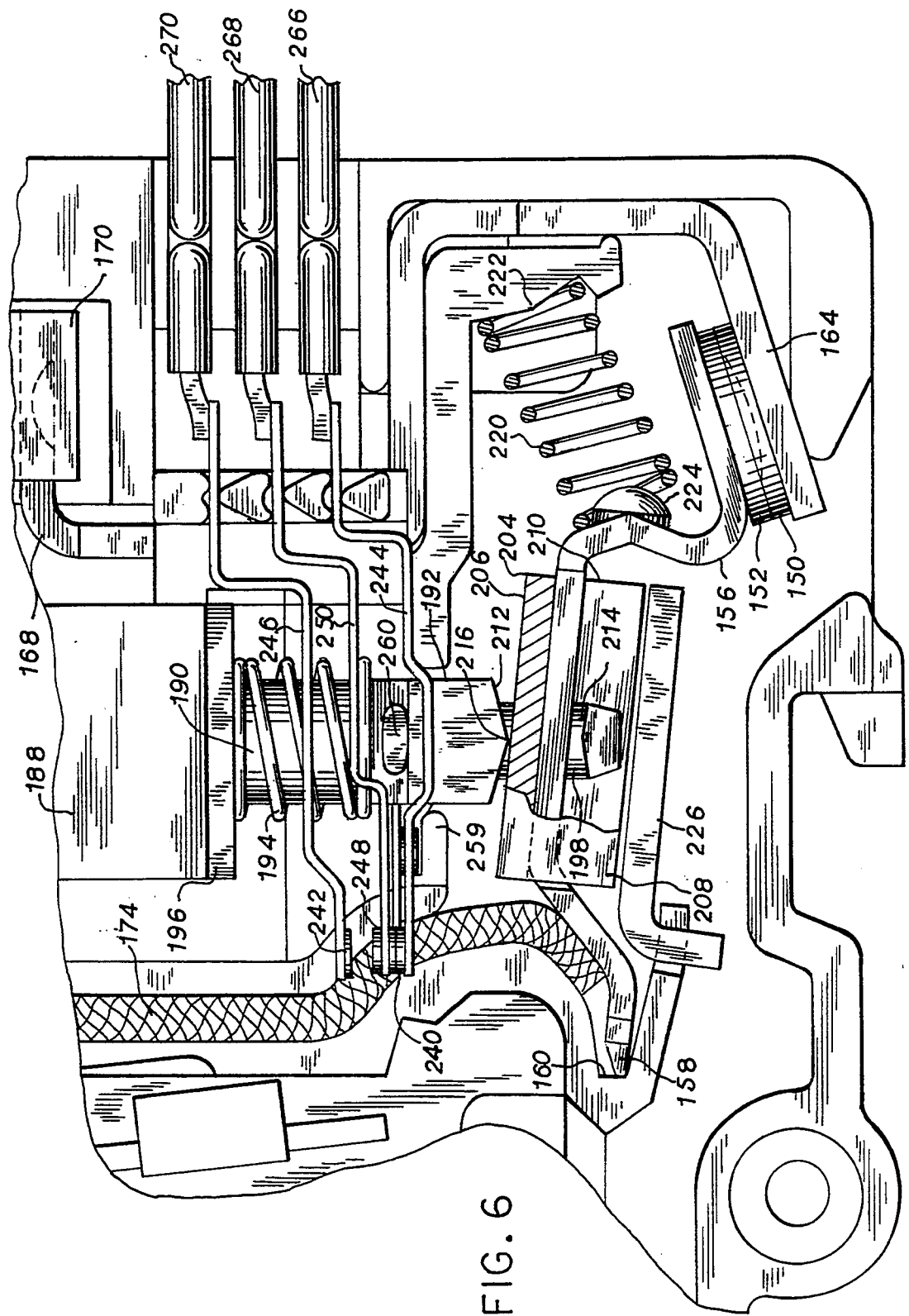
FIG. 6 is an enlarged view of a portion of the structure of FIG. 3.

Actuator 154 is provided by a solenoid 188, FIG. 4, having a movable plunger with an upper metal section 190 actuated by the solenoid to move along an axial travel path between upper and lower positions, FIGS. 3 and 6, respectively. The solenoid is provided by a Ledex Model TDS-06K from Ledex, Inc., P.O. Box 427, Vandalia, Ohio 45377-0427, though other solenoids and other actuators may be used. In the upper position of the plunger, relay contacts 150, 152 are open, FIG. 3. In the lower position of the plunger, relay contacts 150, 152 are closed, FIG. 6. The plunger includes a lower section 192 of plastic or other insulating material press fit affixed to upper section 190 at serrations 193. A spring 194 bears between lower frame plate 196 of the solenoid and lower plunger section 192 to bias the plunger axially downwardly.

Plunger section 192 has a lower shank portion 198 extending downwardly through aligned apertures 200 and 202 in respective members 204 and 156, FIG. 4. Member 204 has an inverted U-shape, with a bight 206 engaging the top central portion 207 of movable contact arm 156, and a pair of spaced legs 208 and 210 extending downwardly and straddling central portion 207. Plunger section 192 has upper and lower engagement surfaces 212 and 214, FIG. 6, axially spaced along shank 198 by a gap greater than the combined thickness of central portion 207 of movable contact arm 156 and bight 206 of member 204. In the lower position of the plunger, FIG. 6, engagement surface 212 engages the top surface of bight 206 at point 216, and engagement surface 214 is spaced below the undersurface of the central portion 207 of movable contact arm 156. In the upper position of the plunger, FIG. 3, engagement surface 214 engages the undersurface of central portion 207 of movable contact arm 156 at point 218, and engagement surface 212 is spaced above the top surface of bight 206.

Movable contact arm 156 is biased downwardly to the position in FIG. 6 by a negative gradient acting biasing spring 220. A negative gradient acting spring is preferred because it provides decreasing biasing force with increasing separation of switching relay contacts 150, 152 as plunger 192 moves upwardly from the position in FIG. 6 to the position in FIG. 3. Spring 220 bears between the case at point 222 and movable contact arm 156 at a biasing point provided by bead 224 retaining spring 220 during movement. Spring 220 is angled at an oblique angle relative to the path of movement of plunger 192 and contact arm 156 to provide the negative gradient. The oblique plane of spring 220 in FIG. 3 is slightly more horizontal than the oblique plane of spring 220 in FIG. 6. During movement between the positions in FIGS. 3 and 6, spring 220 does not travel over-center. Spring 220 continually compresses during the entire range of motion thereof in changing from the oblique plane of FIG. 6 to the oblique plane of FIG. 3 during movement of plunger 192 from its lower position to its upper position. Spring 220 continually expands during the entire range of motion thereof in changing from the oblique plane of FIG. 3 to the oblique plane of FIG. 6 during movement of plunger 192 from its upper position to its lower position. Relay contacts 150, 152 engage, FIG. 6, along a plane obliquely angled relative to the direction of movement of plunger 192. The oblique plane of engagement of contacts 150, 152 is generally parallel to the oblique plane of spring 220.

Spaced engagement surfaces 212 and 214 along shank 198 of plunger 192 provide a lost motion coupling between the plunger and movable contact arm 156. During movement of plunger 192 from its lower position in FIG. 6 to its upper position in FIG. 3, the plunger initially moves through the lost motion, followed by hammer blow impact engagement of movable contact arm 156 by engagement surface 214 of plunger 192 to aid in the breaking of any tack welds between switching relay contacts 150, 152, followed by continued movement of plunger 192 upwardly against the decreasing bias of spring 220. The oblique angled plane of engagement of contacts 150, 152 also facilitates the breaking of tack welds.

Magnetic flux coupling structure, including an armature provided by member 204 and a pole piece 226, provide a hold down electromagnet adjacent movable contact arm 156 and urging switching relay contacts 150, 152 to the closed condition, FIG. 6, with increasing force with increasing current flow therethrough, thus preventing blow-apart of the relay contacts 150, 152. This reduces the holding requirements of spring 220 under overload current conditions, such that relay contacts 150, 152 remain closed, and breaker contacts 44, 46 break the circuit in the event of overload current. Pole piece 226 is stationary and has a left end located on the bottom rightwardly turned end 227 of dividing wall 40, and has a rear edge located in elongated recess 228 in back wall 42 of base 30. Legs 208 and 210 of U-shaped armature 204 extend downwardly toward and are movable into close proximity with pole piece 226 upon downward movement of contact arm 156. In an alternate embodiment, the magnetic flux coupling structure is instead provided by a non-inverted U-shaped member below the movable contact arm.

A feedback circuit is responsive to energization of actuator 154 to provide status indication of the condition of switching relay contacts 150, 152. A third set of contacts is provided by auxiliary feedback contacts including axially spaced contacts 240 and 242, FIG. 4, mounted on respective contact terminals 244 and 246, and a contact 248 axially movable between contacts 240 and 242 and mounted on a movable contact arm 250 lying in the path of movement of and engaged by plunger 192 during axial movement thereof. There is also provided a fourth set of contacts providing actuator energization control contacts including axially spaced contacts 252 and 254 mounted respectively on contact terminal 256 and movable contact arm 258. Contact 254 is axially movable into and out of engagement with contact 252, and movable contact arm 258 lies in the path of movement of and is engaged by plunger 192 during axial movement thereof. Terminals 244 and 256 rest on the lower portion of a shoulder 259 integrally formed with dividing wall 40. The third set of contacts 240, 242, 248 and the fourth set of contacts 252, 254 are spaced from each other transversely of the axial path of movement of plunger 192 and on opposite sides of the plunger. Plunger 192 has distally opposite trunnions 260 and 262 extending outwardly therefrom and respectively engaging movable contact arms 250 and 258. When plunger 192 is in its downward position, FIG. 6, contact 248 engages contact 240, and contact 254 engages contact 252. When plunger 192 is in its upward position, FIG. 3, contact 248 engages contact 242 and is separated from contact 240, and contact 254 is separated from contact 252.

Figure 10:
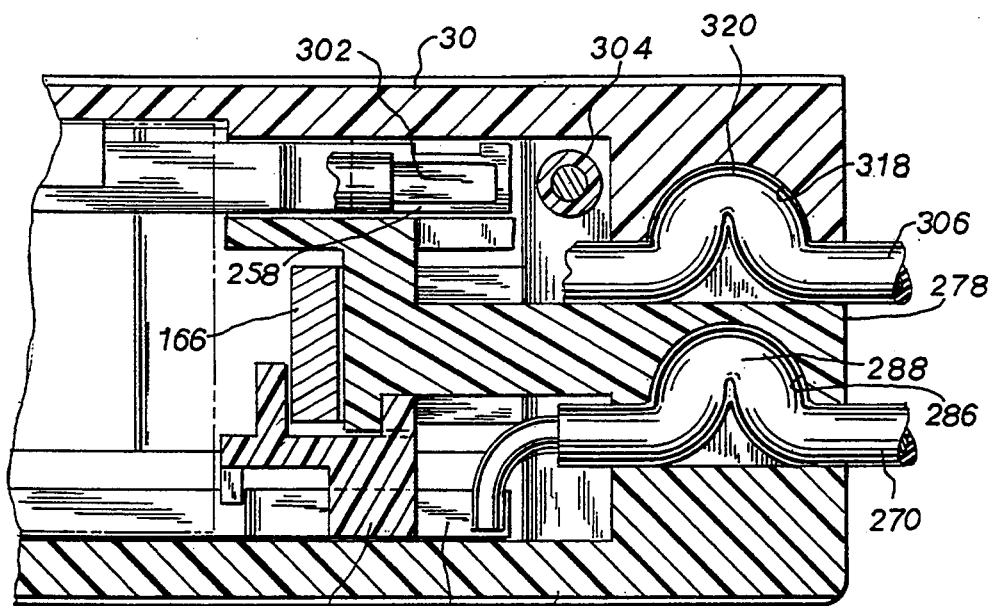
FIG. 10 is a sectional view taken along line 10—10 of FIG. 9.
Figure 9:
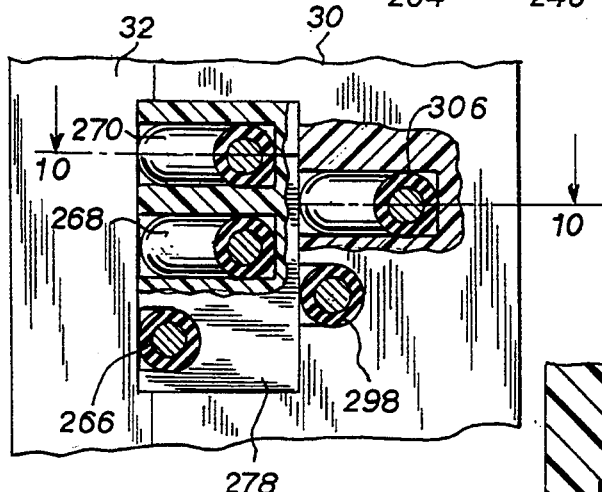
FIG. 9 is an end view, partially broken away, of a portion of the structure of FIG. 1.
Figure 11:
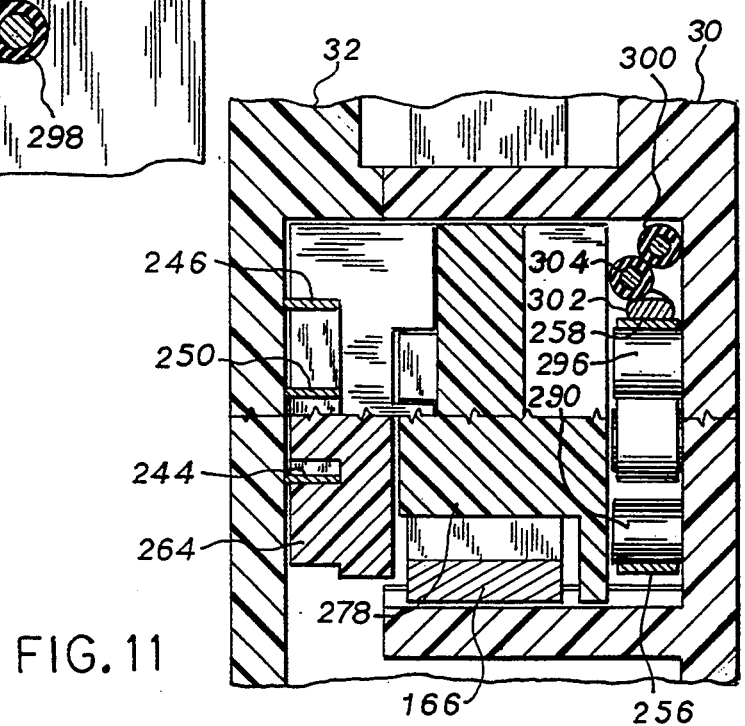
FIG. 11 is a sectional view taken along line 11—11 of FIG. 7.

Contact terminals 244, 250, 246 have rightward ends secured by a retaining block 264, and affixed by soldering, welding, brazing, mechanical crimping or the like to respective conductors 266, 268, 270 extending externally of the case for connection to indicator circuitry, FIG. 13, having a pair of indicator lamps 272 and 274 and a voltage source 276. Conductors 266, 268, 270 extend through a retainer block 278, FIG. 4, having respective guide slots 280, 282, 284, each with a semicircular recess such as recess 286 for slot 284, FIGS. 4, 5 and 10. The U-shaped recess receives a U-shaped bend in the respective conductor, such as U-shaped bend 288, FIGS. 5 and 10, of conductor 270, for trapped retention of the conductor.

When plunger 192 is in its downward position, FIG. 6, contacts 248 and 240 are closed, which completes a circuit through voltage source 276 and lamp 272, FIG. 13, whereby illumination of lamp 272 indicates that relay contacts 150 and 152 are closed, which in turn indicates that current is being supplied to load 184 (in the absence of a tripped condition of breaker contacts 44, 46), thus providing load management information and positive feedback indication. When plunger 192 is in its upper position, FIG. 3, contacts 248 and 242 are closed, which completes a circuit through voltage source 276 and a lamp 274, whereby illumination of lamp 274 indicates that relay contacts 150 and 152 are open, which in turn indicates that current is not being supplied to load 184, and hence such load has been shed for load management or other purposes.

Figure 5:
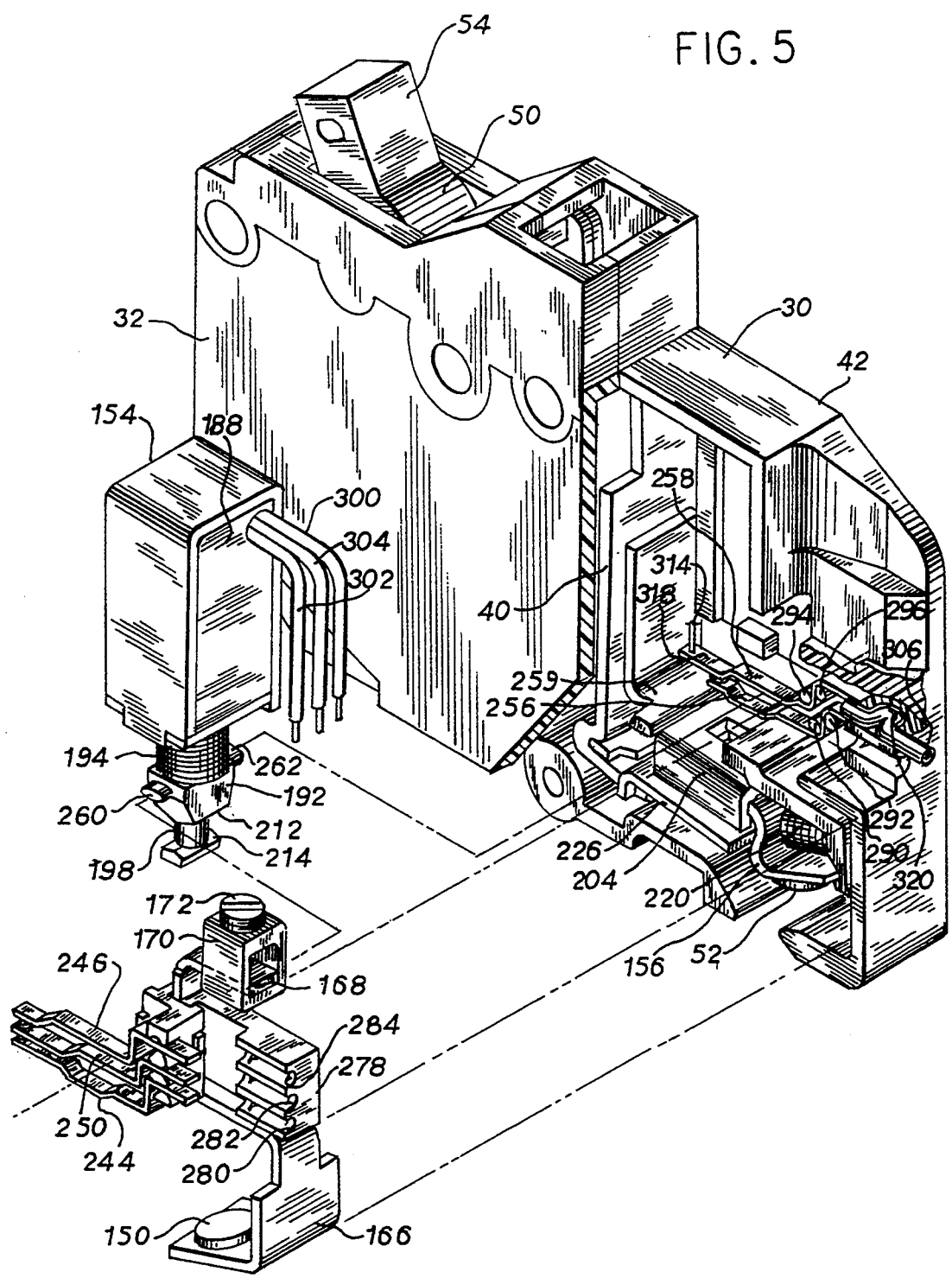
FIG. 5 is like FIG. 4 and shows partial assembly.
Figure 7:
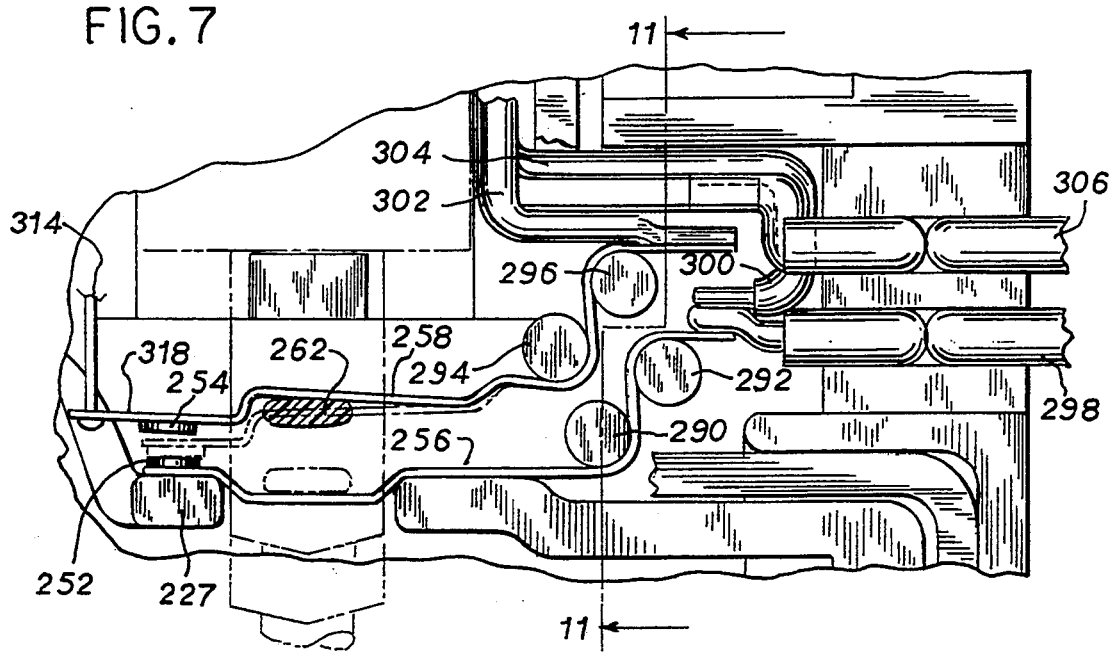
FIG. 7 is an enlarged side view of a portion of the structure of FIG. 5.
Figure 8:
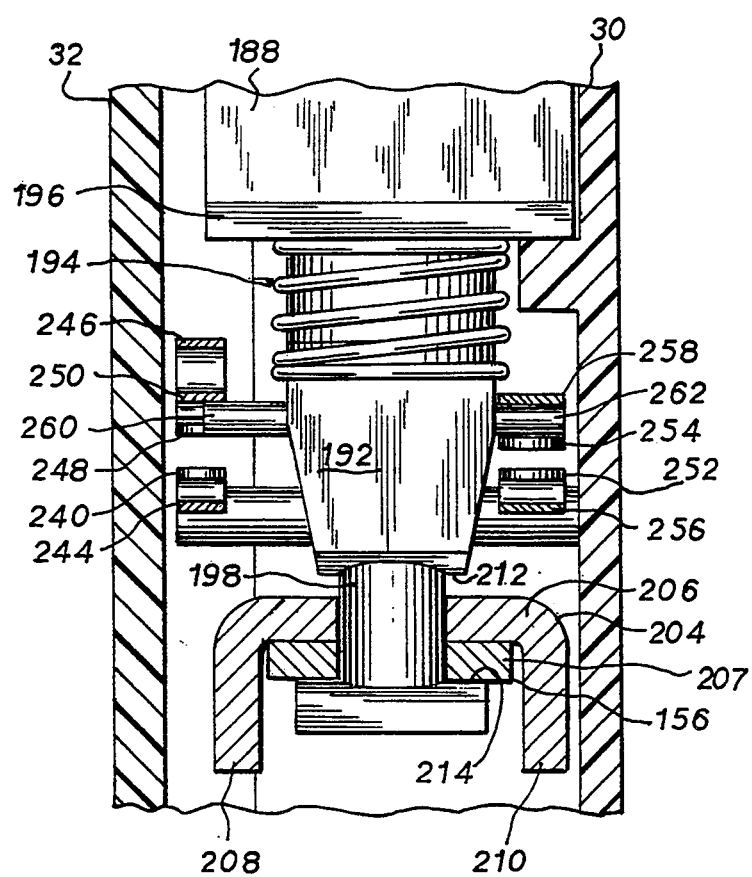
FIG. 8 is a sectional view taken along line 8—8 of FIG. 3.

Contact terminals 256 and 258 have rightward ends retained by respective bosses 290, 292 and 294, 296, FIGS. 5 and 7, extending integrally from back wall 42 of base 30. The right end of terminal 256 is affixed by soldering, welding, brazing, mechanical crimping or the like to a conductor 298, FIGS. 7 and 13, extending externally of the case, and to a conductor 300, FIGS. 7, 13 and 4, connected to solenoid 188. The right end of terminal 258 is affixed to conductor 302 which is connected to the solenoid. The solenoid has a third conductor 304 which is connected to a conductor 306 extending externally of the case. The external circuitry includes a remote control source 308, FIG. 13, including a switch 310 for completing a circuit through voltage source 312 between conductors 298 and 306. Conductors 298 and 306 extend through respective slots 314 and 316 in the case, FIGS. 2 and 4, and each slot has a semicircular recess for receiving a U-shaped bend of the respective conductor, for example recess 318 receiving U-shaped bend 320 of conductor 306, FIGS. 5 and 10, to retain the respective conductor.

The noted Ledex solenoid 188 includes a pickup coil energized by control signal current on conductor 302, and a holding coil energized by control signal current on conductor 300. Conductor 304 provides a common return. When the relay contacts 150, 152 are closed, the solenoid plunger 190 is in its downward position, FIG. 6. When it is desired to shed load 184, remote switch 310 is closed, which completes a circuit from voltage source 312 through conductor 298, terminal 256, contacts 252, 254, terminal 258 and conductor 302 to the pickup coil of solenoid 188, which circuit is returned through conductor 304, conductor 306 and closed switch 310 to source 312. A circuit is also completed from voltage source 312 through conductor 298, and terminal 300 to energize the holding coil of solenoid 188. Energization of the pickup coil and holding coil of the solenoid causes upward retraction of the solenoid plunger to the position shown in FIG. 3, to open relay contacts 150, 152, and hence stop current flow to load 184. During upward movement of the plunger, trunnion 262 engages the underside of contact terminal arm 258 to move contact 254 upwardly out of engagement with contact 252, to break the circuit to the solenoid pickup coil. Only the holding coil is necessary to hold the plunger in its upward position. The bias of spring 194 is small and easily overcome.

The negative gradient acting of spring 220 facilitates the use of a small solenoid with reduced holding requirements, thus enabling packaging in the noted three-quarter inch width breaker case. The noted magnetic flux coupling structure 204, 226 providing a hold down electromagnet urging the switching relay contacts 150, 152 to their closed condition with increasing force with increasing current flow therethrough, also reduces the holding requirements of spring 220 under overload current conditions, which reduced requirements of spring 220 further reduces the solenoid holding requirements, further facilitating the noted packaging in a three-quarter inch width breaker case.

In an alternate embodiment, further indication is provided by a mechanical link 314, FIG. 3, and indicator flag 316 actuated by movement of the solenoid plunger to indicate status of the latter. Mechanical link 314 extends axially downwardly and is connected to movable contact arm 258 at extension 318, FIG. 4, extending leftwardly beyond contact 252. The upper end of link 314 is connected to flag 316 which is pivoted at 320 to the upper left corner of the frame of solenoid actuator 154. Flag 316 has a narrow width of about one-quarter inch such that in its downward pivoted position, shown in dashed line in FIG. 3, the flag passes in front of adjusting screw 88, and in the upward pivoted position, shown in solid line in FIG. 3, the flag allows access to adjusting screw 88. In a further alternative, link 314 is connected to movable contact arm 250.

In the construction shown, solenoid 188 and switching relay contacts 150, 152 in right compartment 38 operate independently of trip structure 48 and overload breaker contacts 44, 46 in left compartment 36. Solenoid 188 has an energized state actuating switching relay contacts 150, 152 to their open condition, and the solenoid has a non-energized state in which the switching relay contacts 150, 152 are returned to their closed condition, FIG. 3, in response to biasing spring 220. The series circuit through overload breaker contacts 44, 46 and switching relay contacts 150, 152 is broken when solenoid 188 is energized such that there is no current-induced heating of the overload trip structure 48 in left compartment 36. This avoids heating of case 22 concurrently by the trip structure in left compartment 36 and the solenoid in right compartment 38, such that the case is heated by only one of the solenoid and the trip structure at a time, not both.

The arrangement is also desirable because load 184, FIG. 13, is energized by de-energizing solenoid 188, and load 184 is de-energized by energizing solenoid 188, i.e. the branch circuit normally has power available to it to energize load 184 if desired by the user, and which the user is accustomed to. Remote control of the breaker to de-energize load 184 requires energization of solenoid 188. Hence, if no action is taken by remote controller 308 or if there is an interruption of power from voltage source 312, etc., solenoid 188 remains de-energized, and switching relay contacts 150, 152 remain closed, and the branch circuit remains energized, with power available to load 184 if desired by the local user. Lamps 272 and 274 are local and indicate to the local user whether the branch circuit containing load 184 has been shed or not.

This positive feedback indication is desirable to the user so that he knows whether a remote controller, such as the utility company, has remotely controlled the local branch circuit breaker to shed load 184 (lamp 274 is illuminated), or not (lamp 272 is illuminated). Indicating lamps or other indicators may also be provided at the remote location to provide feedback status indication to the remote controller such as the utility company. Either or both of these types of positive feedback indication are desirable particularly when load 184 has been shed, so that it is known that such load is not defective or otherwise at fault, for example to avoid an unnecessary service call for a non-operating water heater, air conditioner, furnace or the like, if such appliance has been intentionally shed.

Figure 14:
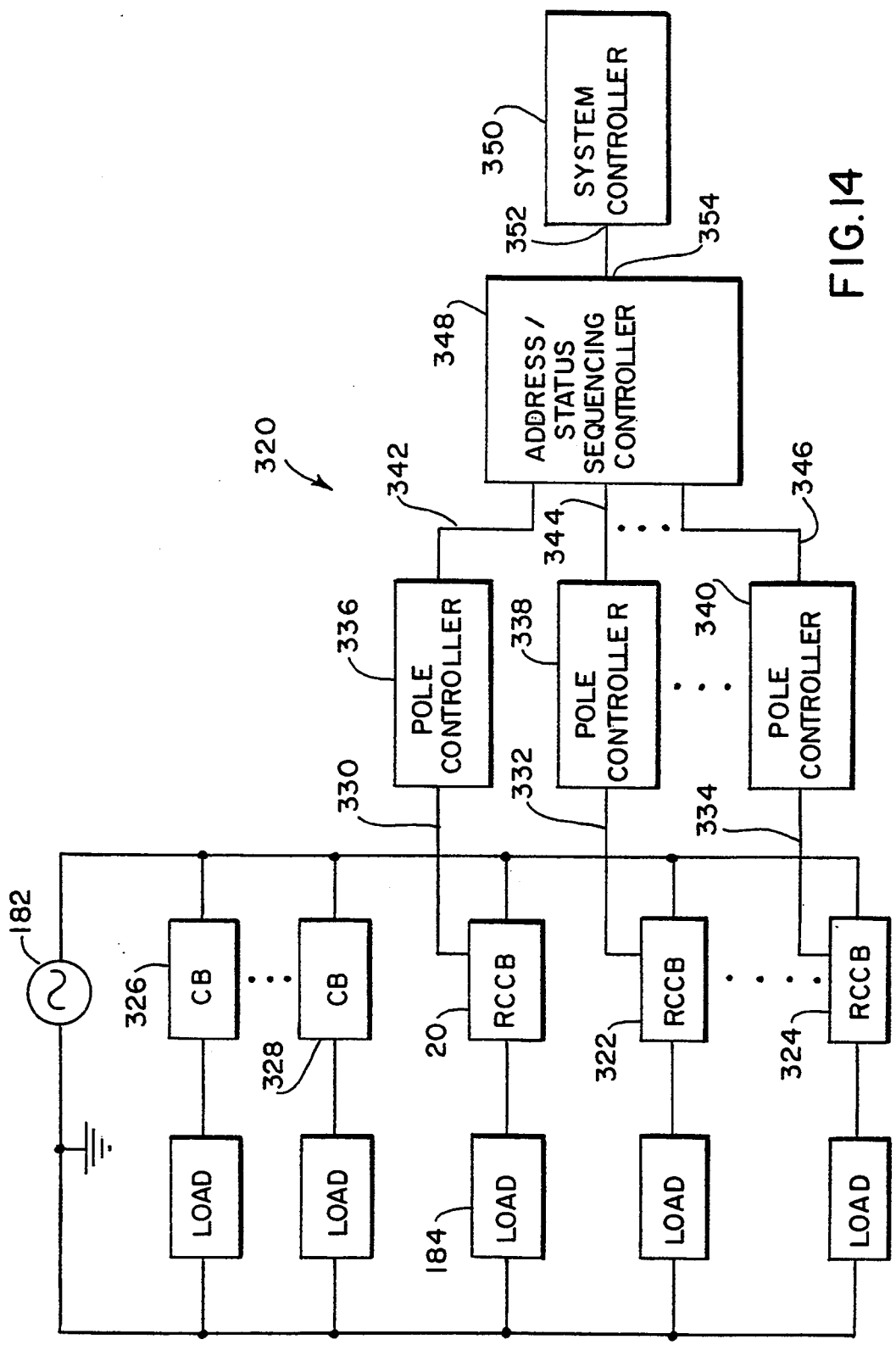
FIG. 14 is a schematic circuit diagram of a remote control circuit breaker system in accordance with the present invention.

FIG. 14 shows a remote control circuit breaker system 320 having a plurality of circuit breakers 326, 328, etc., and a plurality of remote control circuit breakers 20, 322, 324, etc., each connected in a respective load line, e.g. at load 184, FIGS. 14 and 13, to an AC source 182 provided by the power utility company. The circuit breakers are housed in a circuit breaker panelboard, to be described, at the distribution point of electrical service to the home or building.

The remote control circuit breakers 20, 322, 324, etc., each include a switch, for example switching relay contacts 150 and 152 actuated by solenoid 188, FIG. 13, responsive to a control signal 330, 332, 334, etc. for controllably completing and interrupting a respective load circuit. A plurality of pole controllers 336, 338, 340, etc., are provided, and each is responsive to a respective address signal 342, 344, 346, etc., and coupled to a respective circuit breaker 20, 322, 324 and supplying the respective control signal 330, 332, 334 to the switch in the respective remote control circuit breaker 20, 322, 324, for example relay contacts 150 and 152 and solenoid 188 as shown in FIG. 13. Each pole controller includes a status circuit, to be described, responsive to actuation of the respective switch in the respective remote control circuit breaker and supplying a status signal indicative thereof. A common controller 348 supplies address signals 342, 344, 346, etc. Common controller 348 is responsive to a home automation system controller 350, which for example may be a SMART HOUSE system controller Model No. SC0AC14C which includes a SMART HOUSE Branch Slave Chip Model No. SMOS-CM2BC000, Rev. 0.1, and one or more SMART HOUSE Appliance Chips Model No. CM2AC000, Rev. 0.0, where SMART HOUSE assigned pin number and port designations are shown in FIG. 15 for clarity and to facilitate understanding.

Figure 15:
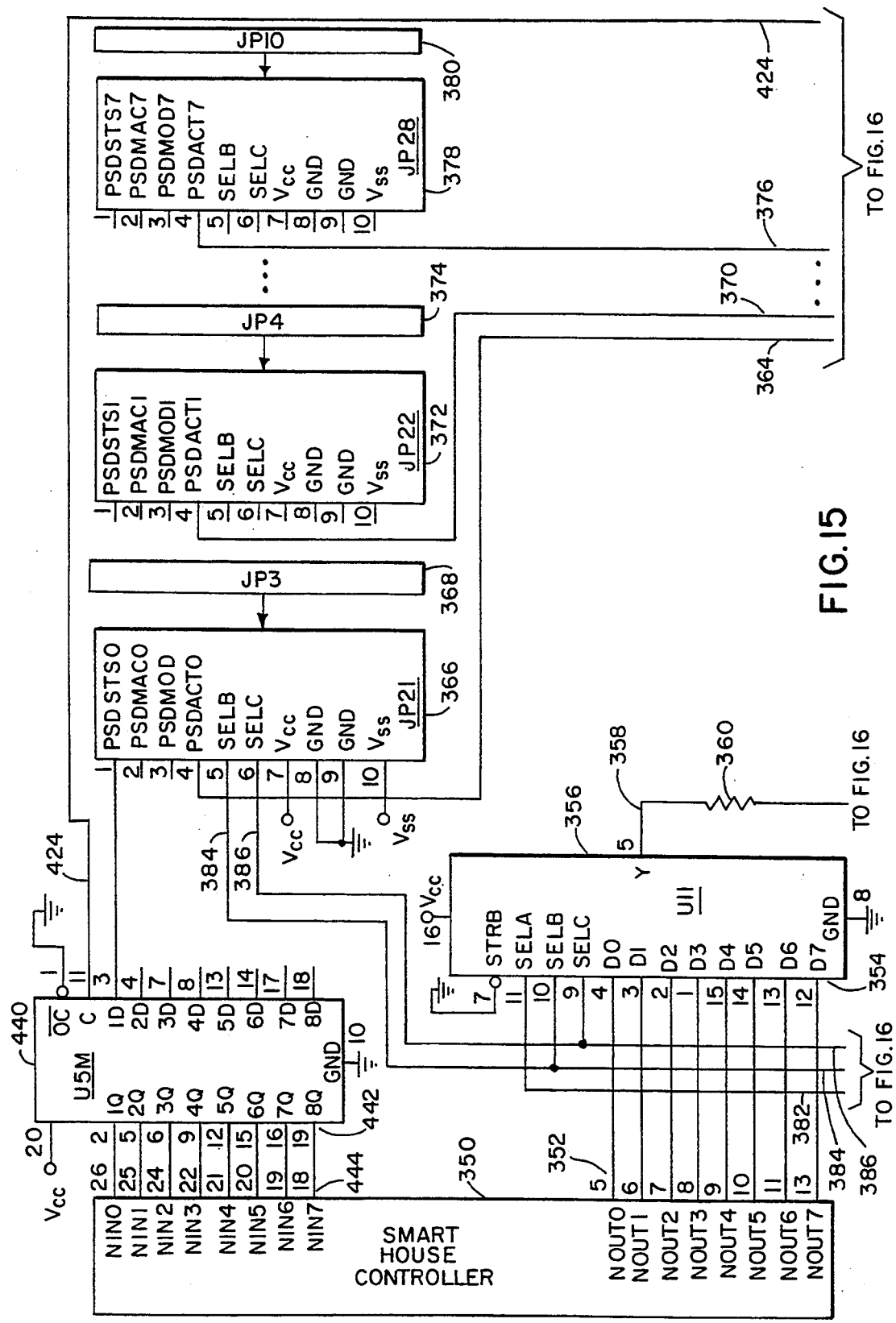
FIGS. 15 and 16 are a circuit diagram illustrating the address/status sequencing common controller of FIG. 14.
Figure 16:
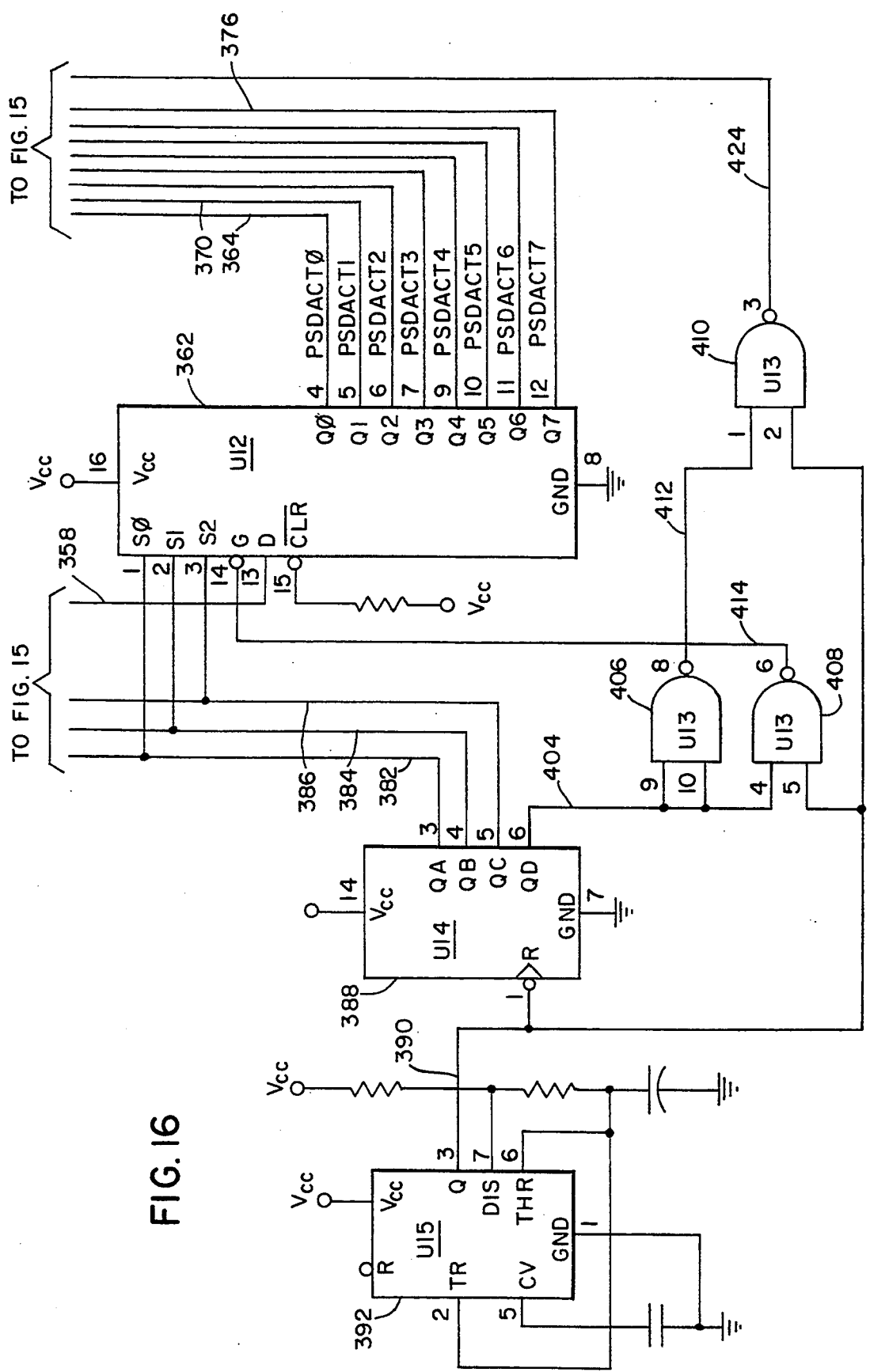

Common controller 348 provides address and status sequencing, and is further shown in FIGS. 15 and 16. SMART HOUSE system controller 350, FIG. 14 and 15, has an eight bit five volt logic compatible I/O input-/output port 352 providing control, for example, of up to eight branch load circuits in the home or building. Controller 348 has an eight bit five volt logic compatible I/O input/output port 354 connected to port 352. Port 354 is provided by pins 4 through 1 and 15 through 12 at data inputs D0 through D7 of multiplexer 356, integrated circuit chip U11, provided by a 74HC151 multiplexer, where manufacturer assigned pin numbers and port designations are shown for clarity and to facilitate understanding. The eight parallel data inputs are serialized onto the serial data output line 358 at pin 5 and supplied through resistor 360, FIG. 15 to FIG. 16, to the data input line at pin 13 of demultiplexer 362, integrated circuit chip U12, provided by a 74HC259 bit addressed latch, where manufacturer assigned pin numbers and port designations are shown. The serial data on line 358 is demultiplexed and output at parallel data outputs Q0 through Q7 at pins 4 through 7 and 9 through 12. A PSDACT0 signal at pin 4 of U12 is supplied on line 364, FIG. 16 to FIG. 15, to conductor pin 4 of a connector 366, header JP21.

The circuitry shown in FIGS. 15 and 16, including header JP21, is on a motherboard printed circuit board, to be described. Another printed circuit board, as shown at 450, FIG. 22, to be described, mounting the pole controller circuitry, to be described, has a conductor tongue portion 368, FIGS. 15, 20, 22, designated JP3, having printed conductor strips thereon, to be described, Tongue portion 368 and header JP21 together comprise an edge connector. The pole controller printed circuit board 450 at tongue portion 368 is inserted or plugged into header JP21 such that conductors 1 through 10 of JP3 are ohmically connected to conductor pins 1 through 10, respectively, of JP21. Data output Q0 of U12 at pin 4 provides signal PSDACT0 supplied on line 364 to pin 4 of header JP21 which in turn is supplied to conductor line 4 of connector JP3, FIG. 20, of the respective pole controller such as 336, FIG. 14. Data output Q1 at pin 5 of U12, FIG. 16, is supplied on line 370, FIG. 16 to FIG. 15, to conductor pin 4 of a connector 372, header JP22, into which is plugged a connector tongue portion 374, JP4, of another pole controller printed circuit board, to provide the connection to pole controller 338. The printed circuit board for pole controller 338 is comparable to that for pole controller 336, including the noted tongue connector portion, for example as shown at 368 in FIG. 20. The remaining data outputs Q2 through Q7 of U12 are likewise supplied on respective connection lines to respective headers, including the eighth data output Q7 at pin 12 of U12 supplied on line 376, FIG. 16 to FIG. 15, to conductor pin 4 of a connector 378, header JP28, into which is plugged a connector tongue portion 380, JP10, of the printed circuit board of pole controller 340. Lines 342, 344, 346, FIG. 14, provide the noted addressing connections to respective pole controllers 336, 338, 340, which connections are provided through pin 4 of JP21 receiving JP3, pin 4 of JP22 receiving JP4, pin 4 of JP28 receiving JP10, respectively.

Figure 17:
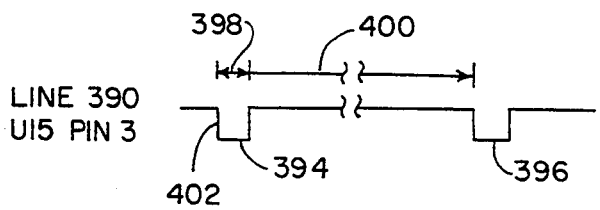
FIG. 17 shows the clocking signal generated by the circuitry of FIGS. 15 and 16.
Figure 18:
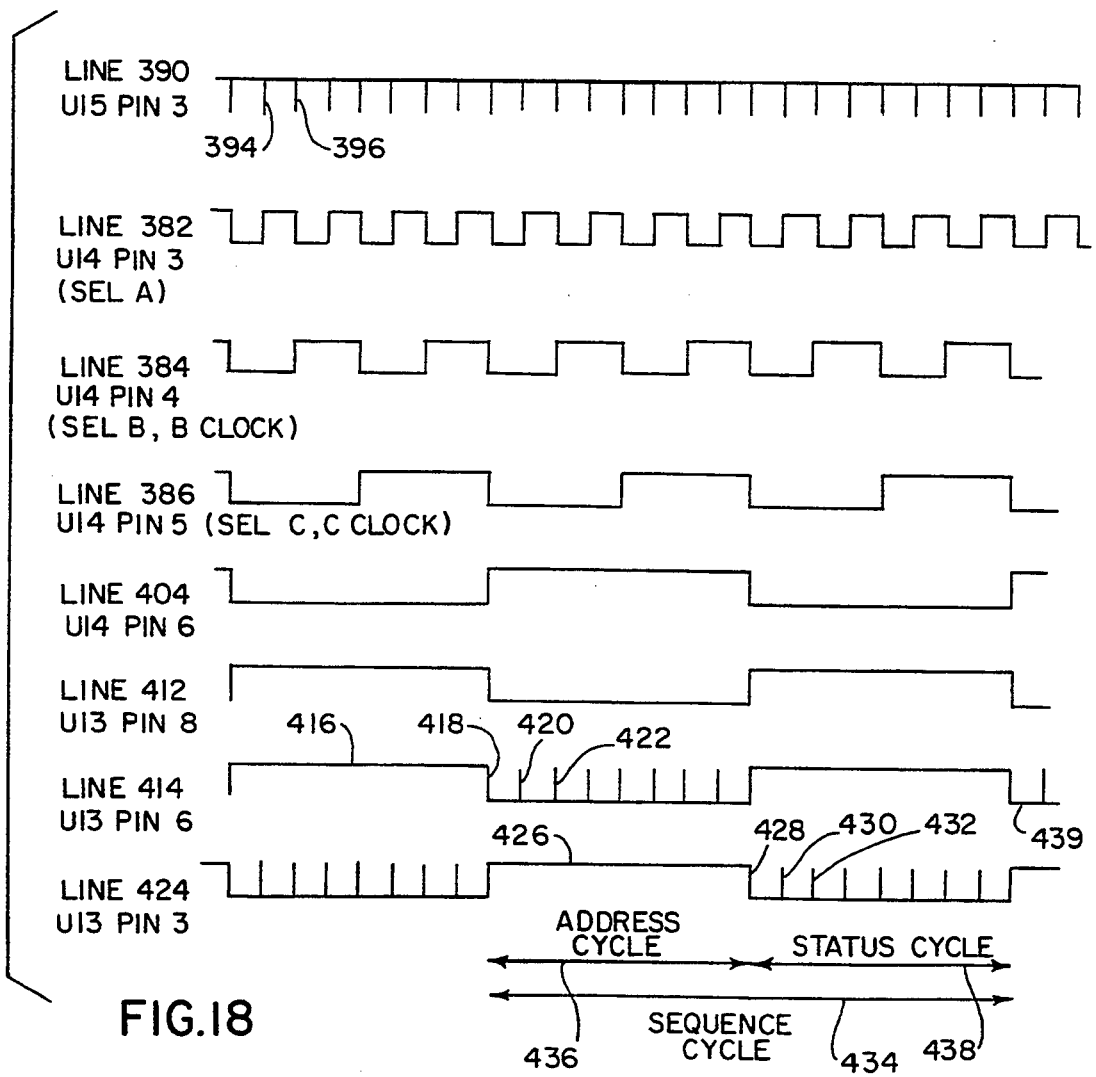
FIG. 18 is a timing diagram illustrating operation of the circuitry of FIGS. 15 and 16.

The multiplexing and demultiplexing sequencing for U11 and U12 are provided by the address selection signals on lines 382, 384, 386 from counter/divider 388, integrated circuit chip U14, provided by a 74HC393 counter, where manufacturer assigned pin numbers and port designations are shown. Counter 388 counts high frequency clock pulses and divides same to provide a plurality of different lower frequency clock signals. Counter 388 counts clock pulses of a clock signal on line 390 from a clock/timer 392, integrated circuit chip U15, provided by a TLC555 timer, where manufacturer assigned pin numbers and port designations are shown. Timer 392 outputs clock pulses 394, 396, etc., FIG. 17. In the example shown, the clock signal has a low duty cycle, with the length 398 of the clock pulse being about one millisecond, and the interval 400 between clock pulses being about 100 milliseconds. The downstroking or negative going transition 402 is used as the clocking triggering signal. Counter 388 counts the clock signal pulses and provides a divided count thereof, as is standard. FIG. 18 shows the clock signal/pulses on line 390 on a different scale than FIG. 17. Line 382 at pin 3 of U14 changes state upon each negative going transition of the clock pulses on line 390. Line 384 at pin 4 of U14 changes state upon each negative going transition of line 382. Line 386 changes state upon each negative going transition of line 384. Line 404 changes state upon each negative going transition of line 386.

A series of NAND gates 406, 408, 410, FIG. 16, are provided by integrated circuit chip U13, a 74HC00 quad NAND gate, where manufacturer assigned pin numbers are shown. Line 404 provides both inputs to NAND gate 406, such that the output thereof at line 412 is high when line 404 is low, FIG. 18, and is low when line 404 is high. NAND gate 408 receives the clock pulses from line 390 at its input pin 5, and receives the divided clock signal from line 404 at its other input pin 4. When line 404 is low, NAND gate 408 is disabled and blocks passage of the clock signal therethrough, and the output of NAND gate 408 at line 414 remains high, as shown at 416, FIG. 18. When line 404 is high, NAND gate 408 is enabled and is clocked by the clock signals on line 390 at pin 5 of U13, i.e. NAND gate 408 is enabled and passes the clock signal therethrough, such that line 414 transitions oppositely to the clock signal/-pulses, as shown at transitions 418, 420, 422, FIG. 18. Line 414 is connected to pin 14 of U12 to provide a gating signal upon each negative going transition to in turn clock in the serial data from the data input at pin 13 of U12 according to the bit addressed by the combination of select A, select B, and select C signals on respective lines 382, 384, 386. The positive or negative state of each of the select A, select B, select C signals on lines 382, 384, 386 provides a three bit address determining which of the eight data output ports Q0 through Q7 of U12 the input data from U11 on line 358 should be routed to upon a transition such as 420, FIG. 18, at pin 14 of U12, as is standard.

NAND gate 410 has one of its inputs supplied by line 412, and its other input supplied by the clock signal on line 390. When line 412 is low, NAND gate 410 is disabled and blocks passage of the clock signal therethrough, and the output of NAND gate 410 at line 424 remains high, as shown at 426, FIG. 18. When line 412 is high, NAND gate 410 is enabled and gates the clock pulses on line 390 therethrough in inverse relation, as shown at transitions 428, 430, 432, etc., FIG. 18.

Interval 434, FIG. 18, provides a sequence cycle, which includes an address cycle 436 having address signals 418, 420, 422, etc. on line 414, and a status cycle 438 having status signals 428, 430, 432, etc., line 424. The parallel data input at ports D0 through D7 of U11, FIG. 15, is serialized by the 3 bit address selection provided by the select A, select B, select C signals on lines 382, 384, 386 connected respectively to pins 11, 10, 9 of U11. The serialized multiplexed data is sequentially output on line 358. The serial data is demultiplexed at U12 and sent out as parallel data at data outputs Q0 through Q7 to the respective pole controllers 336, 338, etc., FIG. 14, during address cycle 436, FIG. 18. Upon completion of the address cycle, a status cycle 438 begins during which the status of activation of the switch in the remote control circuit breaker 20, for example contacts 150 and 152, by solenoid 188 in breaker 20, FIG. 13, is checked to confirm actuation, if any, in response to a control signal 330, FIG. 14, from pole controller 336 responding to address signal 342, to be described. The status signal is generated after generation of the address signal, for confirming actuation of the switch in the remote control circuit breaker in response to the noted control signal from the respective pole controller responding to the respective address signal.

Controller 348, FIGS. 14–16, generates sequence cycle 434, FIG. 18, which includes address cycle 436 having a plurality of multiplexed address signals 342, 344, 346, etc., followed by status cycle 438 having a plurality of multiplexed status signals 428, 430, 432, etc. The status cycles are provided between the address cycles. The status signals preferably are provided on lines 330, 332, 334, FIG. 14, to be described, which are the same lines providing the respective control signals from the respective pole controller to the respective remote control circuit breaker. The status cycle 438, FIG. 18, begins upon completion of the address cycle 436. Upon completion of the status cycle 438, the next address cycle 439 begins.

Line 424, FIG. 16 to FIG. 15, is connected to the clock input of a latch 440, integrated circuit chip U5M, provided by a 74HC373 latch, where manufacturer assigned pin numbers and port designations are shown. Negative going status clocking signal 428, FIG. 18, on line 424 at pin 11 of U5M clocks in the data inputs 1D through 8D of latch 440 to data outputs 1Q through 8Q, and provides an eight bit five volt logic compatible I/O port 442 connected to eight bit five volt logic compatible I/O port 444 of controller 350 for providing status information thereto. Each succeeding status clocking signal 430, 432, etc., FIG. 18, clocks the data inputs to the data outputs of latch 440. This is preferred because it gives an early status indication of the first addressed pole controller, and still allows sufficient time for status indication back from the last addressed pole controller.

Figure 19:
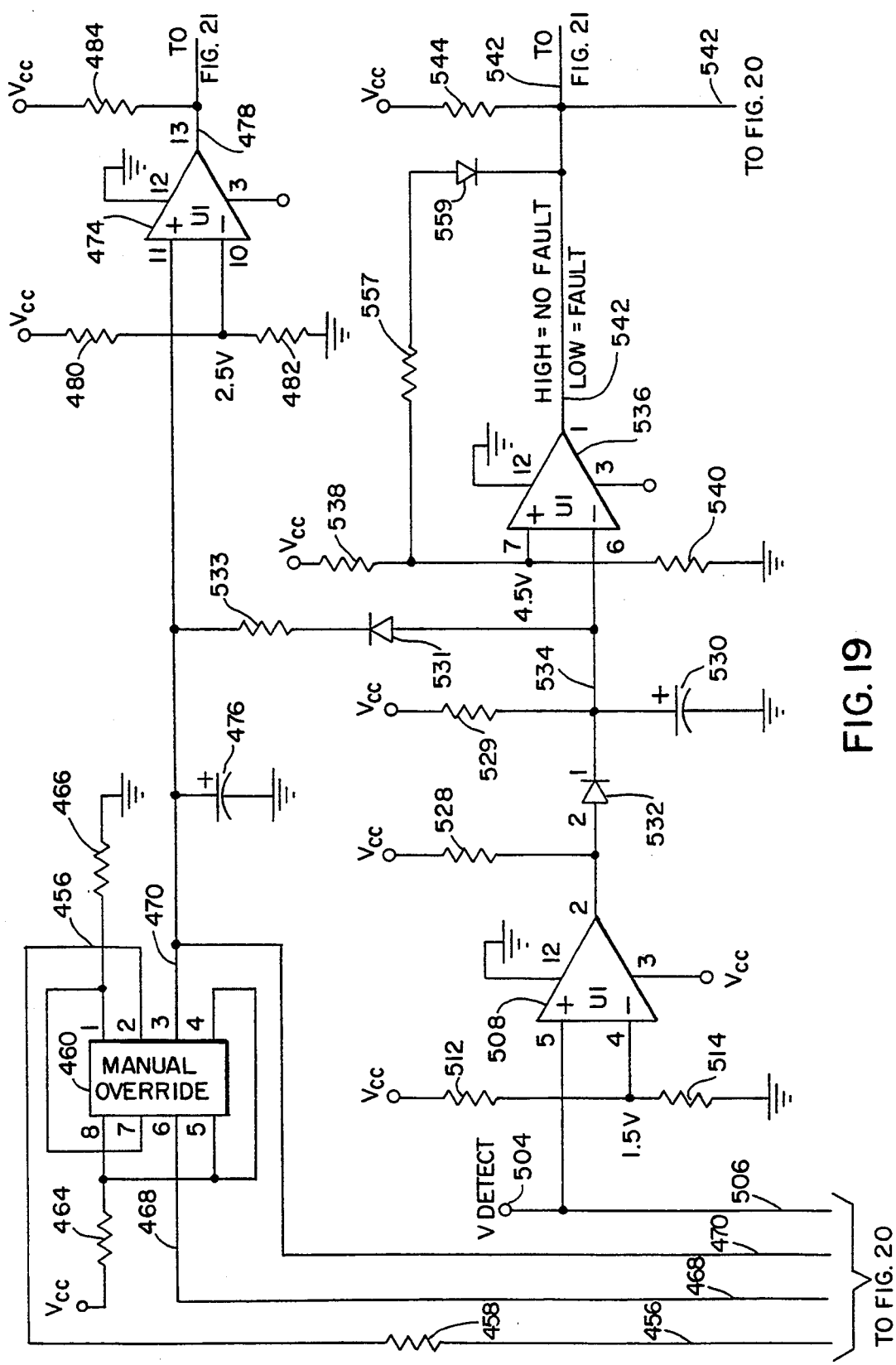
FIGS. 19–21 are a circuit diagram showing the pole controller circuitry of FIG. 14.
Figure 20:
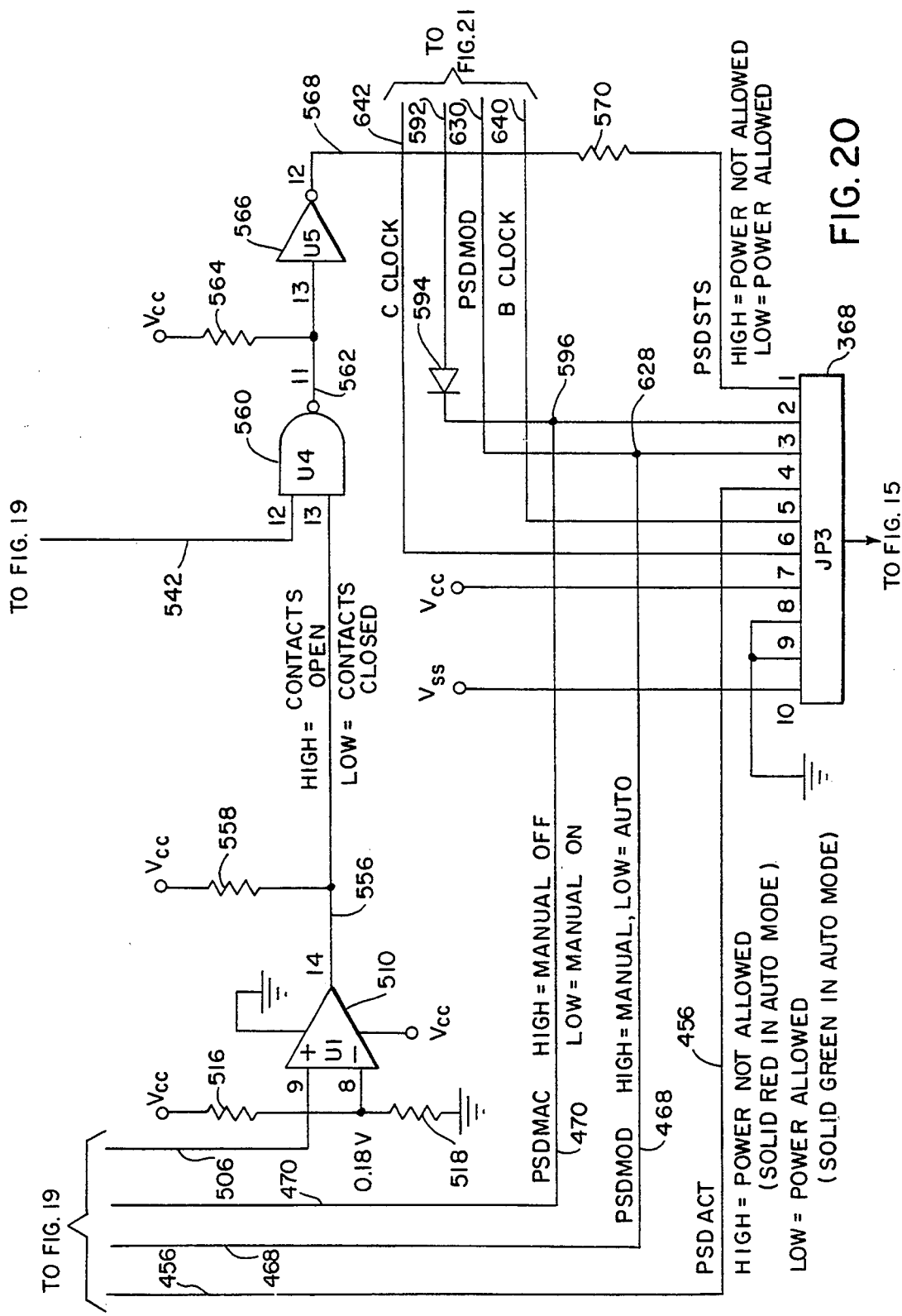
Figure 21:
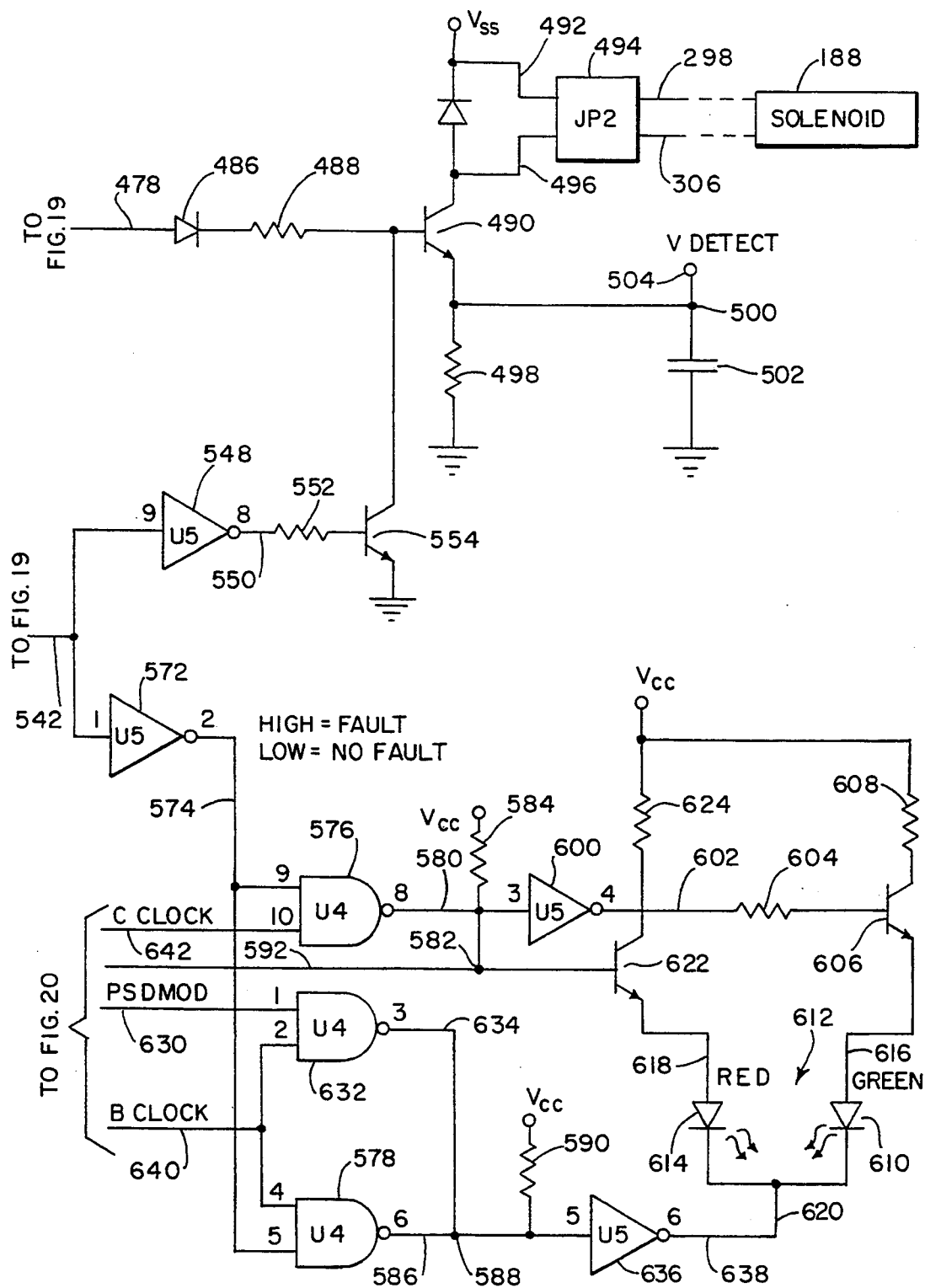

FIGS. 19–21 show the circuitry of pole controller 336 of FIG. 14. The pole controller circuitry is mounted on a printed circuit board 450, FIG. 22, housed within a molded insulating case 452 having an opening 454 through which a tongue portion 368 of the printed circuit board extends. Tongue portion 368 is inserted into header JP21, FIG. 15. Printed circuit board tongue portion 368 has a plurality of printed conductor strips thereon numbered 1 through 10 at JP3, FIGS. 20 and 22, which ohmically contact respective conductors 1 through 10 of JP21, FIG. 15, upon mounting of pole controller 336 to the motherboard by inserting JP3 into JP21 in plugged-in relation.

The address signal 342, FIG. 14, from controller 348 at pin 4 of header JP21, FIG. 15, is provided as a PSDACT0 signal to conductor 4 of JP3, FIG. 20, line 456. Line 456, FIG. 20 to FIG. 19, is connected through resistor 458 to pin 2 of manual override switch 460 provided by a DP3T switch, where manufacturer assigned pin numbers are shown. Override switch 460 has a user engageable sliding handle 462, FIGS. 22–25, which handle extends forwardly through the front panel of a service center, FIGS. 26–28, to be described, similarly to circuit breaker handle 54.

Figure 22:
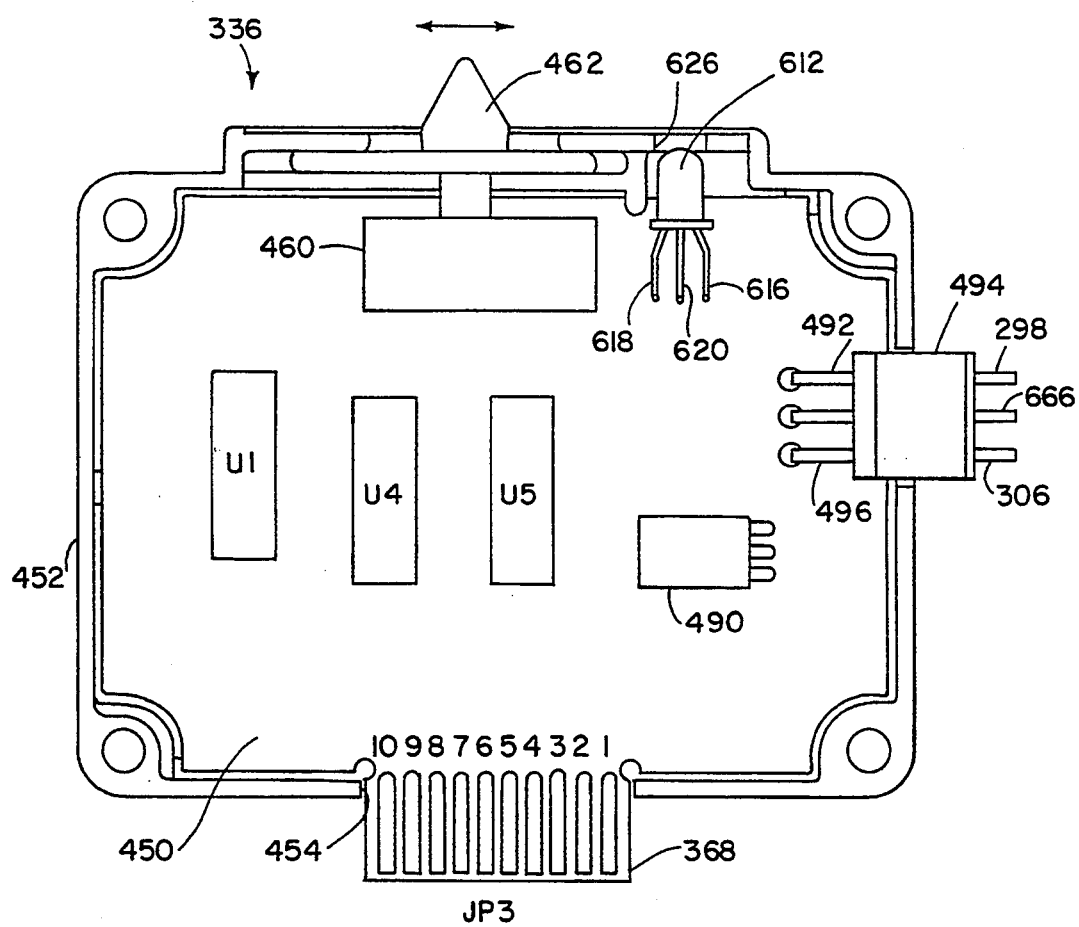
FIG. 22 is a side view of a pole controller with the cover of the molded insulating case removed.
Figure 23:
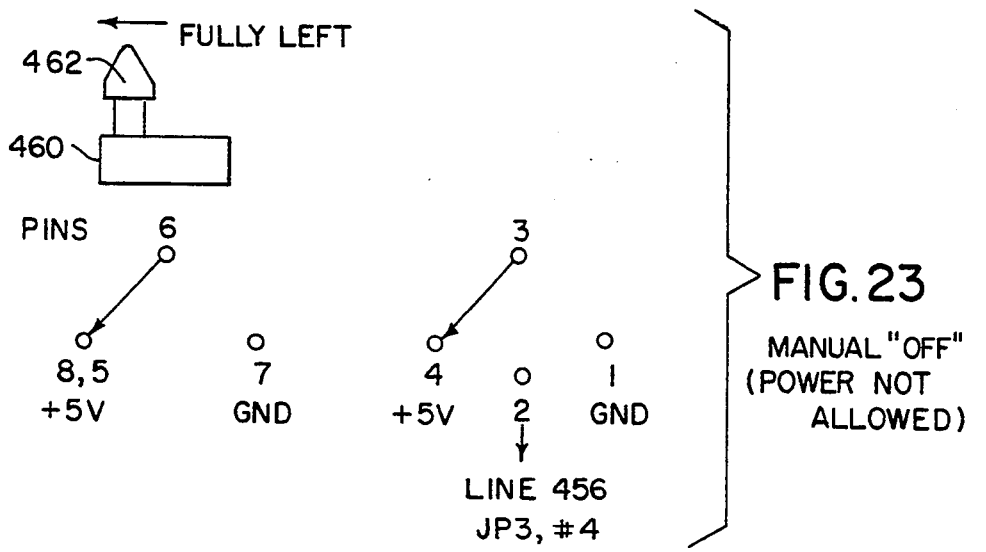
FIG. 23 is a schematic illustration of a pole controller manual override switch in a first position.

Handle 462 of switch 460 has a first fully leftward position, FIG. 23, connecting pin 6 of switch 460 to pins 8 and 5, and connecting pin 3 to pin 4. Handle 462 has a central position, FIG. 24, connecting pin 6 to pin 7, and connecting pin 3 to pin 2. Handle 462 has a fully rightward position, FIG. 25, connecting pin 6 to pins 8 and 5, and connecting pin 3 to pin 1. Pins 8, 5 and 4, FIG. 19, are connected through a resistor 464 to a voltage source $V_{cc}$, e.g. 5 volts. Pins 7 and 1 are grounded through resistor 466. Pin 2 is connected by line 456 to conductor number 4 of JP3 which has the PSDACT addressing signal from pin 4 of header JP21, FIG. 15, which is the address signal line 342 from controller 348, FIG. 14. Pin 6 of switch 460, FIG. 19, provides a PSDMOD signal on line 468, FIG. 19 to FIG. 20, which indicates whether switch 460 and pole controller 336 is in the automatic or manual mode. When handle 462 is in the central position, FIG. 22, switch 460 places the pole controller in the automatic mode. When handle 462 is in either the left position, FIG. 21, or the right position, FIG. 23, switch 460 places the pole controller in a manual mode. The state of the PSDMOD signal on line 468 indicates whether the pole controller is in the automatic or manual mode. Pin 3 of switch 460 provides a PSDMAC signal on line 470, FIG. 19 to FIG. 20, indicating whether the manual mode is off or on. The pole controller is placed in the manual off mode by moving handle 462 fully left, FIG. 21. The pole controller is placed in the manual on mode by moving handle 462 fully right, FIG. 23. In the manual off mode, pole controller 336, FIG. 14, overrides common controller 348 and provides a control signal 330 to remote control circuit breaker 20 interrupting the load circuit regardless of any address signal 342 provided by common controller 348 to the pole controller 336. In the manual on mode, pole controller 336 overrides common controller 348 and allows completion of the load circuit by remote control circuit breaker 20 regardless of any address signal 342 provided by common controller 348 to pole controller 336. In the automatic mode, pole controller 336 enables control signal 330 to be controlled by common controller 348.

Figure 24:
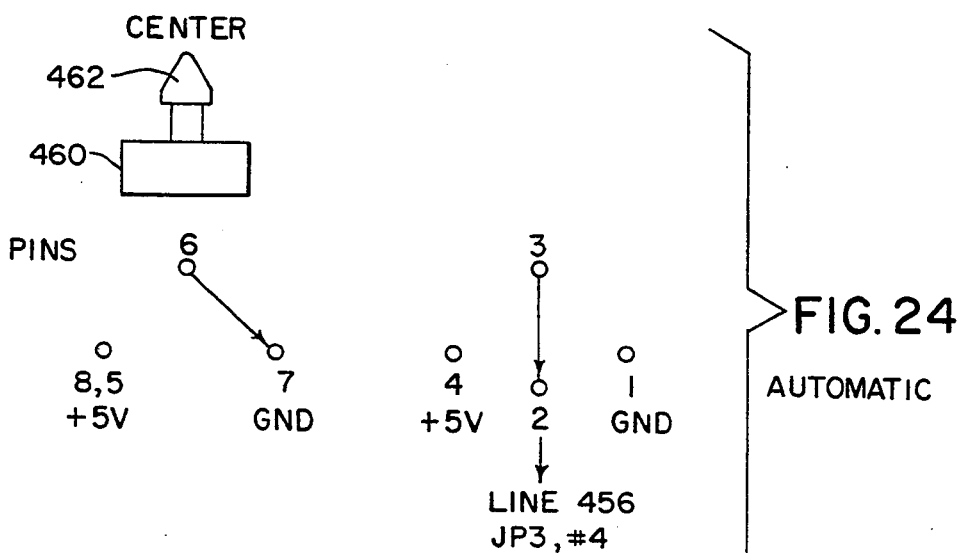
FIG. 24 is a schematic illustration of a pole controller manual override switch in a second position.

In the automatic mode, with handle 462 in its center position, FIG. 24, pin 2 of switch 460, FIG. 19, is connected to pin 3, such that a PSDACT signal on line 456 from controller 348 on line 342 is output to line 470. Line 470 is connected to the noninverting input of comparator 474, integrated circuit chip U1, provided by an LM339AN quad comparator, where manufacturer assigned pin numbers are shown. A high state of the PSDACT signal on line 470 charges capacitor 476 such that the voltage level at the noninverting input of comparator 474 at pin 11 of U1 rises above a comparison threshold reference voltage at the inverting input of comparator 474 at pin 10 of U1, such that the output of the comparator at line 478 at pin 13 of U1 goes high. The comparison threshold reference voltage at pin 10 of U1 is set by the voltage divider provided by resistors 480 and 482, and is set at 2.5 volts. Capacitor 476 acts as a filter and provides a slight charging delay to prevent false tripping.

Line 478, FIG. 19, is connected through pull-up resistor 484 to voltage $V_{cc}$, and is connected, FIG. 19 to FIG. 21 through diode 486 and resistor 488 to the base of bipolar NPN transistor 490, provided by a 2N6039 transistor. A high state on line 478 drives transistor 490 into conduction to complete a circuit from voltage source $V_{ss}$, in this case 24 volts, through line 492 to connector 494, designated JP2, provided by a 3C0NNH connector, then through conductor 298 to solenoid 188, FIG. 13, then through conductor 306 back to connector 494, then through line 496, transistor 490, and resistor 498 to ground. Connector 494 provides connection to solenoid 188 at conductors 298 and 306, FIGS. 21 and 13. Switch 310 in FIG. 13 is transistor 490 in FIG. 21. Voltage source 312 in FIG. 13 is the 24 volt supply $V_{ss}$ in FIG. 21. Completion of the noted circuit by biasing transistor 490 into conduction supplies current to solenoid 188, FIG. 13, which in turn retracts plunger 190 to separate and open the relay contacts 150 and 152, as above described, thus interrupting the respective load circuit and removing electrical power from load 184.

The current flowing through conductor 298, FIGS. 13 and 21, to solenoid 188 and returned through conductor 306 is monitored and sensed to provide a status signal indicating whether solenoid 188, plunger 190 and relay contacts 150 and 152 were successfully actuated. Solenoid coil current flow is sensed by detecting the voltage drop across resistor 498, FIG. 21, which is connected in series in the solenoid coil current flow path through transistor 490. The sensed voltage at node 500 is filtered by capacitor 502 to provide a detected voltage $V_{detect}$ at terminal 504. Terminal 504 is connected, FIG. 21 to FIG. 19, to the noninverting input of comparator 508. Terminal 504 is also connected by line 506, FIG. 19 to FIG. 20, to the noninverting input of comparator 510. Comparators 508 and 510 are part of the noted U1 integrated circuit chip. A reference voltage of 1.5 volts is provided at the inverting input of comparator 508 at pin 4 of U1 by the voltage divider provided by resistors 512 and 514. A reference voltage of 0.18 volts is provided at the inverting input of comparator 510 at pin 8 of U1 by the voltage divider provided by resistors 516 and 518.

Figure 26:
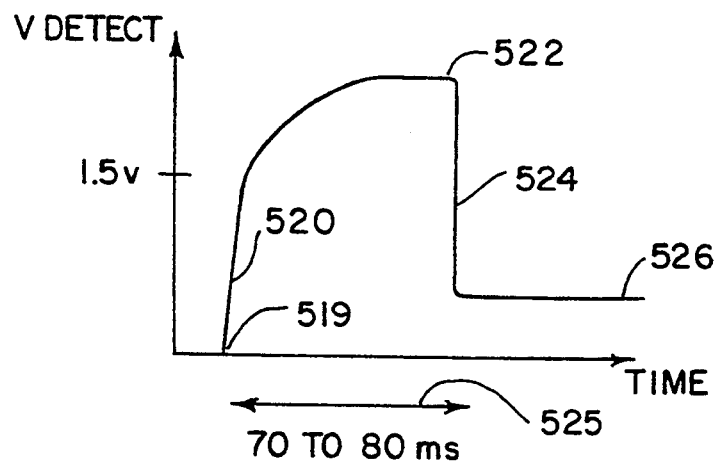
FIG. 26 shows a given current versus time profile of control signal current.

FIG. 26 shows the voltage $V_{detect}$ at node 500 induced across resistor 498 due to current flow therethrough. The $V_{detect}$ voltage at node 500 is proportional to such current. FIG. 26 shows a voltage and hence current versus time profile of solenoid coil current flow for normal solenoid actuation. Initially, current is applied to both the pick-up coil and the holding coil of the solenoid, and the voltage at node 500 rises rapidly as shown at 520 to level 522 representing the voltage level due to current flow through both the pick-up coil and the holding coil.

Comparator 510, FIG. 20, monitors the initially applied control signal current supplied to solenoid 188 and provides a pre-status signal indicating that current has been applied to the solenoid. Upon initiation of current flow to the solenoid, $V_{detect}$ rises rapidly at 520, FIG. 26. As $V_{detect}$ rises above an initial threshold value, nominally just above zero, in this case 0.18 volts, the voltage on line 506 at pin 9 of U1 rises above the 0.18 reference voltage at pin 8 of U1, and hence the output of comparator 510 on line 556 at pin 14 of U1 goes high, through pull-up resistor 558. The high state on line 556 provides a preliminary indication that relay contacts 150 and 152 should be open, assuming normal solenoid actuation including the rapid rise at 520, FIG. 26, to level 522. Line 556 is connected to one of the inputs of NAND gate 560, integrated circuit chip U4, provided by a 74HC03 quad NAND gate chip, where manufacturer assigned pin numbers are shown. The high state on line 556 provides a preliminary enable signal to NAND gate 560. The other input to NAND gate 560 on line 542 is initially high, to be described. Hence, both inputs to NAND gate 560 are initially high as $V_{detect}$ rises above an initial nominal value 519, FIG. 26, e.g. 0.18 volts. The output of NAND gate 560 on line 562 at pin 11 of U4 is thus initially low. Line 562 is connected to an inverter 566, integrated circuit chip U5, provided by a 74HC04 quad inverter chip, where manufacturer assigned pin numbers are shown. The low state on line 562 is thus inverted by inverter 566 to a high state on line 568 at pin 12 of U5, which high state is provided through resistor 570 and provides a high PSDSTS signal providing a pre-status indication that power to load circuit 184, FIG. 13, is not allowed, because relay contacts 150 and 152 should be open, assuming normal solenoid actuation.

If the initially applied solenoid coil current does not cause $V_{detect}$ to rise above the nominally low value 519 in FIG. 26, i.e. 0.18 volts, then the output of comparator 510, FIG. 20, on line 556 stays low, indicating the absence of solenoid coil current, and hence an indication that relay contacts 150 and 152 are closed. The low state on line 556 disables gate 560, and hence the output of gate 560 on line 562 at pin 11 of U4 is high, through pull-up resistor 564. The high state of line 562 is inverted by inverter 566 to a low state at line 568 which provides a low PSDSTS signal, indicating that power to load 184, FIG. 13, is allowed, because relay contacts 150 and 152 are closed.

Assuming normal solenoid actuation, both the pick-up coil and the holding coil draw current, and $V_{detect}$ rises rapidly at 520, FIG. 26, to level 522, thus retracting plunger 190, FIG. 13, as above described. Upon retraction of plunger 190, typically about 70–80 milliseconds after energization, contacts 252 and 254 are opened, interrupting current flow to the pick-up coil by conductor 302, whereafter current is applied only to the holding coil by conductor 300. The $V_{detect}$ voltage at node 500 caused by such current flow then drops as shown at 524, FIG. 26, to level 526 which is the voltage induced at node 500 due to current flow only through the holding coil of solenoid 188. The 1.5 volt comparison threshold reference at pin 4 of U1, FIG. 19, is set to be below $V_{detect}$ voltage level 522.

If the solenoid actuator current characteristic during actuation of the solenoid switch in the remote control circuit breaker exhibits a normal current versus time profile, then the $V_{detect}$ voltage at terminal 504, FIG. 21, will rise to level 522, FIG. 26, and then fall to level 526 within a given time interval, i.e. the given current characteristic is exhibited by an increase in control signal current on line 330, FIG. 14, as provided by conductors 298, 306, FIGS. 13 and 21, followed by a decrease in control signal current, within a given time interval. The control signal current rises to a first level providing $V_{detect}$ level 522, followed by a decrease in control signal current, providing $V_{detect}$ level 526, within given time interval 525.

The noted given time interval is monitored by an RC charging network provided by resistor 528 and capacitor 530, FIG. 19. As $V_{detect}$ at terminal 504 as supplied to pin 5 of U1 rises above 1.5 volts, which is the comparison threshold reference at pin 4 of U1, the output of comparator 508 at pin 2 of U1 goes high. This high signal is supplied through diode 532 and allows capacitor 530 to begin charging from $V_{cc}$ through resistor 528. The output of comparator 508 is also supplied on line 534 to the inverting input of comparator 536, which is the fourth comparator of the noted U1 integrated circuit chip. The noninverting input of comparator 536 at pin 7 of U1 is supplied with a comparison threshold reference of 4.5 volts by the voltage divider network provided by resistors 538 and 540. If capacitor 530 charges above 4.5 volts, then the output of comparator 536 at line 542 transitions low, indicating a fault.

For a normal actuation of solenoid 188, capacitor 530 will not charge above 4.5 volts within 70 to 80 milliseconds. For normal actuation, $V_{detect}$ decreases at 524, FIG. 26, from level 522 to level 526 within about 70 to 80 milliseconds, and hence the voltage at pin 5 of U1 drops below 1.5 volts, such that the output of comparator 508 at pin 2 of U1 goes low, and hence capacitor 530 stops charging, whereby the voltage at pin 6 of U1 remains below 4.5 volts, and hence the output of comparator 536 at pin 1 of U1 remains high, through pull-up resistor 544, indicating no fault. A large resistor 529 maintains a minimum charge on capacitor 530 from $V_{cc}$. Diode 531 and resistor 533 provide a connection to line 470 such that when line 470 is low it pulls pin 6 of U1 low, maintaining a high, no fault, signal at output line 542 of comparator 536. Diode 531 and resistor 533 also provide a current path for discharging capacitor 530 when line 470 is low, to reset capacitor 530.

If the $V_{detect}$ voltage continues at a high level 522, FIG. 26, beyond the noted 70 to 80 milliseconds, then solenoid 188, FIGS. 13, 21, continues to draw high current. For example, if relay contacts 150, 152, FIG. 13, weld, then plunger 190 does not retract, and contacts 252 and 254 do not separate, and hence both pick-up coil current and holding coil current continue to be applied to solenoid 188 by respective conductors 256 and 300. In this situation, the $V_{detect}$ voltage at terminal 504, FIG. 19, continues at level 522, FIG. 26, beyond the noted 70 to 80 millisecond time interval. The noninverting input of comparator 508 at pin 5 of U1 continues to remain above the comparison threshold voltage of 1.5 volts at the inverting input of comparator 508 at pin 4 of U1, and hence the comparator output on line 534 at pin 2 of U1 continues to remain high. Capacitor 530 thus continues to charge, and the voltage thereacross rises above 4.5 volts, which is the comparison threshold voltage at the noninverting input of comparator 536 at pin 7 of U1, whereby the output of comparator 536 on line 542 at pin 1 of U1 goes low indicating a fault.

The low state fault signal at the output of comparator 536 on line 542, FIG. 19 to 21, is inverted high by inverter 548, FIG. 21, provided by the noted U5 integrated circuit chip. The high output of inverter 548 on line 550 at pin 8 of U5 is supplied through resistor 552 to the base of bipolar NPN transistor 554, provided by a 2N3904 transistor, driving the latter into conduction. Conduction of transistor 554 diverts base drive current away from transistor 490, turning the latter off, which in turn terminates current flow to solenoid 188, to protect the latter. A feedback connection is provided by resistor 557, FIG. 19, and diode 559 connected between pins 7 and 1 of U1 to reduce the comparison threshold voltage at the noninverting input of comparator 536 at pin 7 of U1 when the output of comparator 536 on line 542 at pin 1 of U1 goes low. The low state on line 542 indicates a fault condition.

Lines 542 and 556, FIG. 20, are connected to the inputs of NAND gate 560, as above described, at pins 12 and 13, respectively, of U4. A high state on line 542 provides a status signal indicating no fault. A low state on line 542 provides a status signal indicating a fault condition. A high state on line 556 provides a preliminary or pre-status indication that contacts 150 and 152 should be open. A low state on line 556 provides a pre-status indication that relay contacts 150 and 152 are closed. If line 556 is initially high, indicating that relay contacts 150 and 152 should be open, but in fact such contacts do not open, e.g. because of welding or the like, then a low state fault signal will appear on line 542 which in turn provides a low state PSDSTS signal, indicating that power is still allowed, even though the solenoid has been energized, thus providing an indication of contact welding or the like. Hence, even if an initial enable signal is provided by the high state on line 556 to NAND gate 560, initially providing a high PSDSTS status signal indicating power not allowed, the output of NAND gate 560 will change states upon receiving the low fault signal on line 542, and hence change the PSDSTS status signal from a high to a low state. If gate 560 is initially enabled by a high state on line 556, and there is no fault condition, then line 542 remains high, and hence the PSDSTS signal remains high, indicating power not allowed, which is the normal expected result upon energization of the solenoid. If an initial disable signal is provided to gate 560, i.e. a low state on line 556, then gate 560 remains disabled, and hence the PSDSTS signal remains low, indicating that power is still allowed, which is an abnormal condition, i.e. upon energization of the solenoid, it is expected that current should flow thereto and open the relay contacts 150 and 152. It is thus seen that even if a high PSDSTS pre-status indication is given, preliminarily indicating that relay contacts 150 and 152 have opened and load circuit 184 has been interrupted, such status is changed by a fault signal on line 542 which causes a low PSDSTS signal indicating that relay contacts 150 and 152 have remained closed and that load circuit 184 has not been interrupted. The fault signal on line 542 thus overrides the pre-status high enable signal on line 556, to provide an indication of the abnormal condition where relay contacts 150 and 152 remain closed, contrary to expectations.

Line 542, FIG. 19 to FIG. 21, is also connected to the input of an inverter 572, FIG. 21, provided by the noted U5 integrated circuit chip. In the normal, nonfault condition, line 542 is high, and hence the output of inverter 572 on line 574 at pin 2 of U5 is low. In the fault condition, line 542 is low, and hence line 574 is high. The output of inverter 572 on line 574 at pin 2 of U5 is connected to an input of NAND gate 576 and to an input of NAND gate 578, which NAND gates are provided by the noted U4 integrated circuit chip.

In the normal or no fault condition, line 574, FIG. 21, is low, and hence the input to NAND gate 576 at pin 9 of U4 is low and the input to NAND gate 578 at pin 5 of U4 is low, whereby gates 576 and 578 are disabled. Hence, the output of gate 576 on line 580 at pin 8 of U4 will follow the voltage at node 582, through pull-up resistor 584, and the output of gate 578 on line 586 at pin 6 of U4 will follow the voltage at node 588, through pull-up resistor 590. Node 582 is connected by line 592, FIG. 21 to FIG. 20, through diode 594, FIG. 20, to node 596 which is connected to conductor 2 of JP3 connector 368 and is also connected to line 470 which carries the PSDMAC signal from pin 3 of switch 460, FIG. 19. In the noted automatic mode, handle 462 is in its central position, FIG. 24, connecting pin 3 of switch 460 to pin 2 which is connected to line 456, FIG. 19, carrying the PSDACT signal, FIG. 20. If the PSDACT signal is high, such high state is conducted through switch 460 from pin to pin 3 and appears on line 470 and at node 596, but is blocked by diode 594 from appearing on line 592 at node 582, FIG. 21. Node 582 is thus free to follow pull-up resistor 584, and is pulled high through pull-up resistor 584. The high state at line 580 and node 582 is inverted low by inverter 600, provided by the noted U5 integrated circuit chip U5.

The output of inverter 600, FIG. 21, on line 602 at pin 4 of U5 is connected through resistor 604 to the base of a bipolar NPN transistor 606, provided by an E2N3904 transistor, which is connected in series with resistor 608 and the green LED 610 of a dual LED lamp 612, provided by an LX5099 dual LED lamp. Dual LED lamp 612 includes a red LED 614, a first connector prong 616 connected to the anode of green LED 610, a second connector prong 618 connected to the anode of red LED 614, and a third connector prong 620 commonly connected to the cathodes of light emitting diodes 610 and 614. When the output of inverter 600 at line 602 is low, transistor 606 is nonconductive, thus blocking current flow from $V_{cc}$ to green LED 610, such that the latter is off and does not emit light. Node 582 is also connected to the base of a bipolar NPN transistor 622, provided by a 2N3904 transistor. Transistor 622 is connected in series with resistor 624 and red LED 614. When node 582 is high, transistor 622 is biased into conduction, to supply current from $V_{cc}$ to red LED 614 such that the latter emits red light. This red light is visible to the operator through window or opening 626, FIG. 22, in case 452. This red light is continuous in the automatic mode when power to the branch load circuit is not allowed, as will now be described.

In the automatic mode, handle 462 is in its central position, FIG. 24, and pin 6 of switch 460, FIGS. 24 and 19, is connected to pin 7 which in turn is grounded through resistor 466. This provides a low state at pin 6 of switch 460 which in turn appears on line 468, FIG. 19 to FIG. 20, providing a low PSDMOD signal. Line 468 is connected at node 628, FIG. 20, to conductor 3 of JP3 connector 368 and is also connected at node 628 to line 630, FIG. 20 to FIG. 21, which supplies the PSDMOD signal to an input of NAND gate 632, FIG. 21, provided by the noted U4 integrated circuit chip. The low state of the PSDMOD signal on line 630 at the input to NAND gate 632 at pin 1 of U4 disables NAND gate 632 such that the output of NAND gate 632 on line 634 at pin 3 of U4 follows the voltage at node 588, through pull-up resistor 590.

Thus, when there is no fault and in the auto mode, each of NAND gates 578 and 632 is disabled, and respective NAND gate outputs 586 and 634 each follow the voltage at node 588, which is pulled high through pull-up resistor 590. The high state at node 588 is inverted low through inverter 636, provided by the noted U5 integrated circuit chip. The output of inverter 636 on line 638 is connected to common cathode connector prong 620 of dual LED lamp 612. When node 588 is high, the output of inverter 636 on line 638 at pin 8 of U5 is low, thereby enabling current flow through red LED 614, as above noted, which current flow is continuous, i.e. nonflashing, thus providing a solid red condition viewed through window or opening 626, FIG. 22.

In the auto mode, if the PSDACT signal on line 456, FIG. 20, is high, and if there is no fault condition, solenoid 188, FIGS. 21 and 13, is energized, as above described, separating and opening relay contacts 150, 152, FIG. 13, to interrupt the load circuit and not allow application of utility electrical power to load 184. In this condition, a solid red indication is provided by dual LED lamp 612.

In the auto mode, if the PSDACT signal on line 456, FIG. 20, is low, then solenoid 188, FIGS. 13 and 21, is not energized, and power is allowed to load 184, FIG. 13, and a continuous, solid, nonflashing green indication is provided by dual LED lamp 612, to now be described. In the auto mode, handle 462 is in its central position, FIG. 24, and pin 2 of switch 460, FIGS. 24 and 19, is connected to pin 3. The low state of the PSDACT signal on line 456, FIG. 20, is supplied through switch 460, FIG. 19, to line 470 which in turn is supplied to the noninverting input of comparator 474 at pin 11 of U1. When the signal on line 470 is low, the voltage at pin 11 of U1 is below the comparison threshold reference voltage at pin 10 of U1, and hence the output of comparator 474 on line 478 at pin 13 of U1 is low. When line 478, FIG. 19 to FIG. 21, is low, transistor 490 is nonconductive, whereby no current is supplied from $V_{ss}$ to solenoid 188. Relay contacts 150, 152, FIG. 13, thus remain closed, allowing utility electrical power to be applied to load 184. The low state at pin 3 of switch 460 supplies a low PSDMAC signal on line 470, FIG. 19 to FIG. 20, 598 to node 596, FIG. 20, and line 592, FIG. 20 to FIG. 21, to node 582, FIG. 21. The low state of the PSDMAC signal on line 592 pulls node 582 low. The low state of node 582 renders transistor 622 nonconductive, such that red LED 614 is off and does not emit light. The low state of node 582 is inverted high at output 602 of inverter 600, which high state biases transistor 606 into conduction, to in turn supply current to green LED 610, such that the latter emits green light and provides a green indication through window 626, FIG. 22. The green illumination is solid and nonflashing because connector prong 620 is held continuously low, as above described, because node 588 is high due to pins 1 and 5 of U4 being low.

Figure 25:
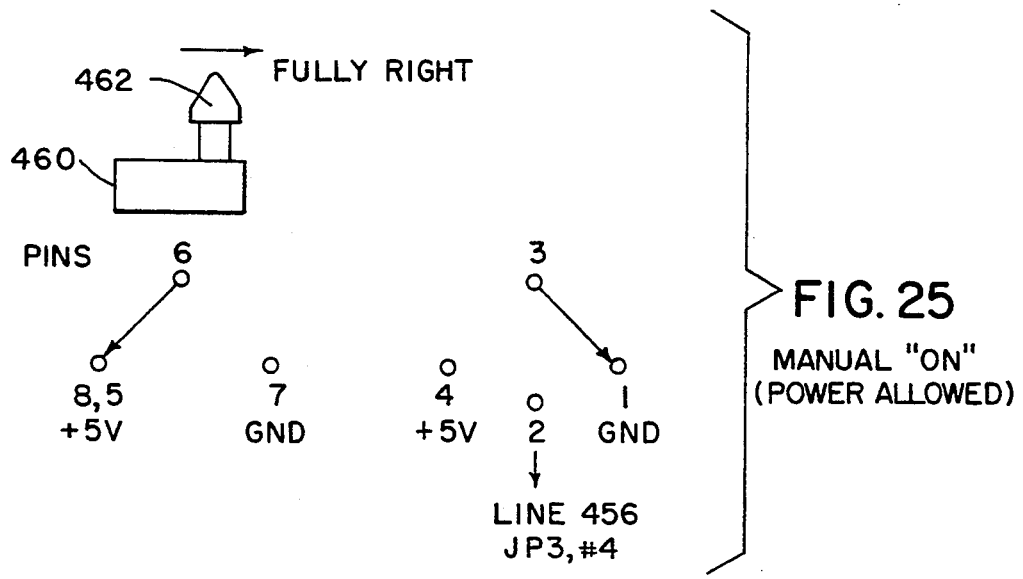
FIG. 25 is a schematic illustration of a pole controller manual override switch in a third position.

The homeowner or building occupant can manually override the automatic system by sliding handle 462 of switch 460 from the center position of FIG. 24 to the leftward position of FIG. 23, or from the center position to the rightward position of FIG. 25.

When handle 462 is in the leftward position, FIG. 23, the system is in a manual mode wherein utility electrical power is not allowed to be applied to load 184, FIG. 13. In the leftward position of handle 462, pin 3 of switch 460, FIGS. 23 and 19, is connected to pin 4 which has a high signal applied thereto from $V_{cc}$. This provides a high state on line 470 which in turn provides a high state to the noninverting input of comparator 474, such that comparator output on line 478 is high. The high state of line 478, FIG. 19 to FIG. 21, biases transistor 490 into conduction, which completes the solenoid energization circuit through conductors 298 and 306, to trip the solenoid to open relay contacts 150, 152, FIG. 13, thus interrupting the load circuit and not allowing application of utility electrical power to load 184.

The leftward position of handle 462, FIG. 23, connects pin 6 of switch 460 to pins 8 and 5 which are at a high state as supplied by $V_{cc}$. The high state at pin 6 of switch 460, FIG. 19, supplies a high PSDMOD signal on line 468, FIG. 19 to FIG. 20, which in turn provides a high signal at node 628 and line 630, FIG. 19 to FIG. 21, to NAND gate 632 at pin 1 of U4. The high state on line 630 enables NAND gate 632 such that the latter follows or is clocked by the signal at its other input at pin 2 of U4. The input signal at pin 2 of U4 is provided by line 640 from conductor 5 of JP3 connector 368, FIG. 20, which in turn receives the select B signal on line 384, FIG. 15, from pin 4 of U14, FIG. 16. The select B signal on line 384 from pin 4 of U14 transitions high and low at a given frequency as shown in FIG. 18. This signal is used as a clocking signal shown at B clock on line 640 in FIGS. 20 and 21.

The B clock signal on line 640, FIG. 21, is input to NAND gate 632 at pin 2 of U4. When NAND gate 632 is enabled by the high state of the PSDMOD signal on line 630 at pin 1 of U4, NAND gate 632 passes the B clock signals therethrough in inverse relation, and the output 634 of NAND gate 632 at pin 3 of U4 transitions high and low at the frequency of the B clock signal, FIG. 18. The B clock signal is thus passed through gate 632, and output line 634 follows such signal, whereby node 588 transitions high and low at the frequency of the B clock signal, which in turn causes line 638 to likewise transition high and low at the B clock frequency, thus flashing red LED 614 on and off. When line 638 is low, current flows through red LED 614, and the latter emits red light. When line 638 is high, current does not flow through red LED 614, and the latter does not emit light.

When handle 462 of manual override switch 460 is in its rightward position, FIG. 25, pin 3 of switch 60 is connected to pin 1 which is low due to its connection to ground. This provides a low state on pin 3 of switch 460, FIG. 19, which provides a low state on line 470 connected to comparator 474, such that the latter's output on line 478 is low. The low state on line 478, FIG. 19 to FIG. 21, renders transistor 490 nonconductive, which in turn prevents current flow to solenoid 188, such that the latter is not energized, and relay contacts 150, 152, FIG. 13, remain closed, thus allowing electrical utility power to be applied to load 184. The low state on line 470, FIG. 19 to FIG. 20, provides a low PSDMAC signal at node 596, diode 594 and line 592, FIG. 20 to FIG. 21, to pull node 582 low. The low state of node 582, FIG. 21, renders transistor 622 nonconductive, such that red LED 614, is off and does not emit light. The low signal at node 582 is inverted by inverter 600 to a high state at line 602 which drives transistor 606 into conduction to conduct current to green LED 610 such that the latter is on and emits green light through window opening 626, FIG. 22.

When handle 462 is in its rightward position, FIG. 25, pin 6 of switch 460 is connected to pins 8 and 5 which are at a high state due to their connection to $V_{cc}$. The high state at pin 6 of switch 460, FIG. 19, provides a high PSDMOD signal on line 468, FIG. 19 to FIG. 20, which is applied through node 628 and line 630, FIG. 20 to FIG. 21, to NAND gate 632 to enable the latter, such that the B clock signal on line 640 passes through gate 632 to node 588, and provides an alternating high and low clocking signal on line 638 at the frequency of the B clock, FIG. 18, as above described. Green LED 610 thus flashes on and off at the frequency of the B clock signal. This indicates to the operator that the system is in a manual override mode with application of electrical utility power to load 184 being allowed.

System operation has been described for the automatic mode, FIG. 24, when there is no fault. System operation has also been described for each of the manual modes, FIGS. 23 and 25. System operation will now be described for the automatic mode when there is a fault.

Upon energization of solenoid 188, FIG. 13, both the pick-up coil and the holding coil draw current, which current induces a voltage across resistor 498, FIG. 21, providing the noted $V_{detect}$ voltage at terminal 504, as shown in FIG. 26. When the $V_{detect}$ voltage rises above 1.5 volts, which is the comparison threshold reference voltage at the inverting input of comparator 508 at pin 4 of U1, FIG. 19, the output of comparator 508 at pin 2 of U1 goes high which enables capacitor 530 to begin charging. As noted above, in the normal nonfault situation, plunger 190 of solenoid 188, FIG. 13, retracts in about 70 to 80 milliseconds, thus opening contacts 252 and 254, whereupon current is applied only to the holding coil of the solenoid, and the current drawn by the solenoid decreases and $V_{detect}$ decreases as shown at 524, FIG. 26, from level 522 to level 526.

In a fault condition, e.g. welding of contacts 150, 152, FIG. 13, preventing retraction of plunger 190, contacts 252 and 254 do not separate, and the solenoid continues to draw both pick-up coil current and holding coil current, and hence the induced $V_{detect}$ voltage remains high and does not decrease at 524, FIG. 26. In this fault situation, the $V_{detect}$ voltage at terminal 504, FIGS. 21 and 19, remains high, and the output of comparator 508 at pin 2 of U1 remains high, whereby capacitor 530 continues to charge, and charges above the 4.5 volt comparison threshold reference at the noninverting input of comparator 536 at pin 7 of U1. Hence, the output of comparator 536 on line 542 at pin 1 of U1 goes low, indicating a fault condition. The low state of line 542 is inverted by inverter 548, FIG. 21, to a high state on line 550 which drives transistor 554 into conduction which in turn diverts base drive current away from the base of transistor 490 such that the latter is rendered nonconductive, thus terminating current flow to solenoid 188, and protecting the latter.

To remove the aforementioned fault condition, the charge on capacitor 530, FIG. 19, must be reduced below the new threshold provided by the feedback circuit of resistor 557 and diode 559 to the noninverting input of comparator 536 at pin 7 of U1. This is accomplished by providing a low state on line 470, which thus provides a discharge path for capacitor 530 through diode 531 and resistor 533. In the manual operation mode, the zero volt low state on line 470 is provided by moving the switch handle 462 to the fully rightward position, FIG. 25. In the automatic mode, a low state of the PSDACT signal on line 456 provides the logic zero, low level on line 470.

The low state fault signal on line 542 is also inverted high by inverter 572, FIG. 21, such that the latter's output on line 574 at pin 2 of U5 is high, which indicates a fault condition. The high signal on line 574 is applied to NAND gate 576 at pin 9 of U4 to enable the gate to pass the signal on line 642 therethrough, i.e. when gate 576 is enabled by a high state at pin 9 of U4, the output of the gate on line 580 at pin 8 of U4 inversely follows the other input of the NAND gate at pin 10 of U4. Line 642, FIG. 21 to FIG. 20, is connected to conductor 6 of JP3 connector 368, FIG. 20, which connector 368 is plugged into JP21 header connector 366, FIG. 15, providing ohmic connection of conductor 6 of JP3 to pin 6 of JP21. Pin 6 of header JP21 receives the select C signal on line 386 from pin 5 of U14, FIG. 16. The select C signal on line 386 from pin 5 of U14 transitions high and low at a given frequency as shown in FIG. 18. This signal is used as a clocking signal shown at C clock on line 642 in FIGS. 20 and 21. The B clock signal frequency on line 384, FIG. 18, is twice the C clock signal frequency on line 386.

When line 574, FIG. 21, is high, gate 576 is enabled, and the C clock signal on line 642 is passed through gate 576, and the output of the gate at line 580 inversely follows the C clock signal on line 642. Node 582 thus transitions high and low at the frequency of the C clock signal. The alternating high and low states at node 582 alternately drive transistors 622 and 606 into conduction. When node 582 is low, transistor 622 is nonconductive, and transistor 606 is conductive since line 602 is high. When node 582 is high, transistor 622 is conductive, and transistor 606 is nonconductive since line 602 is low. The alternating conduction of transistors 606 and 622 alternately supply current to LEDs 610 and 614 such that the latter alternately emit light.

The high state on line 574, FIG. 21, indicating a fault condition, is also applied to an input of NAND gate 578 at pin 5 of U4 to enable gate 578, such that the B clock signal on line 640 is passed through gate 578, and the output of the gate on line 586 inversely follows the other input to the NAND gate at pin 4 of U4. Node 588 thus transitions high and low at the frequency of the B clock signal. The clocking signal at node 588 is inverted by inverter 636 to provide a clocking signal at line 638 which follows the B clock signal. The clocking signal on line 638 is thus twice the frequency of the C clock signal.

Figure 27:
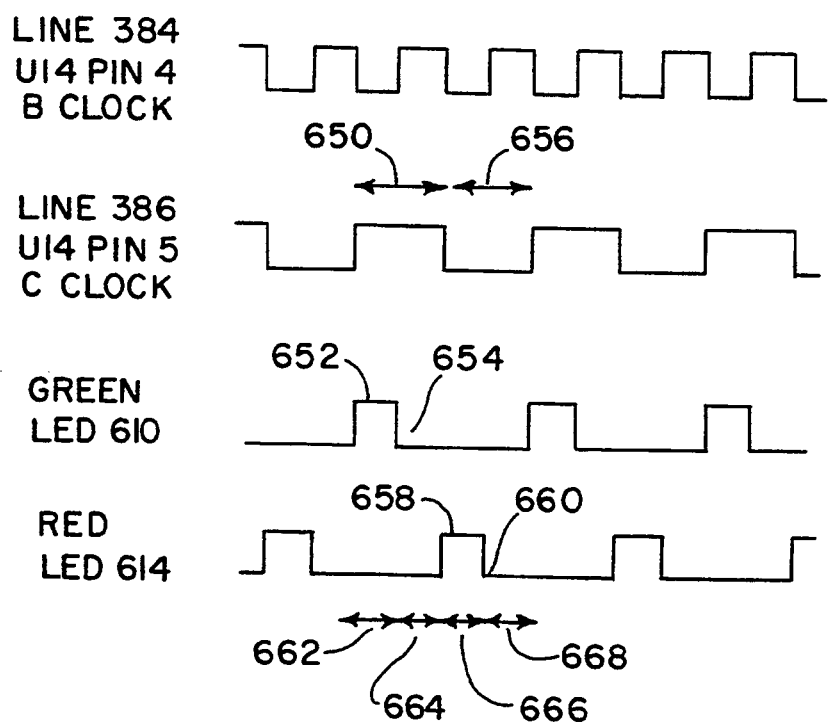
FIG. 27 is a timing diagram illustrating operation of the lamp system circuitry of FIGS. 19–21.

Since the B clock signal at line 638, FIG. 21, is twice the C clock signal alternating the red and green LEDs 610 and 614, the LEDs are flashed on and off at twice the frequency of alternation between red and green. In this manner, during a given half cycle of the C clock, green LED 610 will flash on and off. In the next half cycle of the C clock, red LED 614 will flash on and off. As shown in FIG. 27, during half cycle 650 of the C clock, green LED 610 turns on at 652 and then off at 654, i.e. green LED 610 emits light at 652, and does not emit light at 654. During the next half cycle 656 of the C clock, red LED 614 turns on at 658 and then off at 660, i.e. red LED 614 emits light at 658, and does not emit light at 660. During interval 662, only green light is emitted from LED lamp 612 through window 626, FIG. 22. During interval 664, no light is emitted. During interval 666, only red light is emitted. During interval 668, no light is emitted. Thus, in the noted fault condition, the lamp energizing circuit responds to the status fault signal and alternately flashes red and green colors through window 626.

Manual override switch 460 has the noted leftward position, FIG. 23, overriding controller 348, FIG. 14, and providing a control signal 330, FIG. 14, 298, 306, FIGS. 13 and 21, interrupting the load circuit to load 184 regardless of the address signal PSDACT on line 342, FIG. 14, 364, FIG. 15, 456, FIG. 20, provided by controller 348, FIG. 14, to pole controller 336. Manual override switch 460 has the noted central position, FIG. 24, enabling the control signal 330 to be controlled by controller 348. Manual override switch 460 has the noted rightward position, FIG. 25, overriding controller 348 and allowing completion of the load circuit to load 184 regardless of the address signal PSDACT provided by common controller 348 to pole controller 336.

The dual color lamp 612 includes first and second colors, e.g. red and green. The lamp energizing circuitry responds to the manual override switch 460 and to controller 348 and energizes the lamp such that the red color is flashingly illuminated when manual override switch 460 is in its leftward position, the green color is flashingly illuminated when manual override switch 460 is in its rightward position, the red color is continuously illuminated when manual override switch 460 is in its central auto position and the load circuit to load 184 is interrupted, and the green color is continuously illuminated when manual override switch 460 is in its central position and completion of the load circuit is allowed. The status circuitry supplies a fault status signal, provided by a high state at line 574, FIG. 21, when the switch provided by solenoid 188 and relay contacts 150, 152 in the remote control circuit breaker 20 does not actuate in response to the control signal at 298, 306, FIG. 13, 330, FIG. 14, from the pole controller 336. The lamp energizing circuitry responds to the fault signal and alternately flashes the red and green colors.

Figure 28:
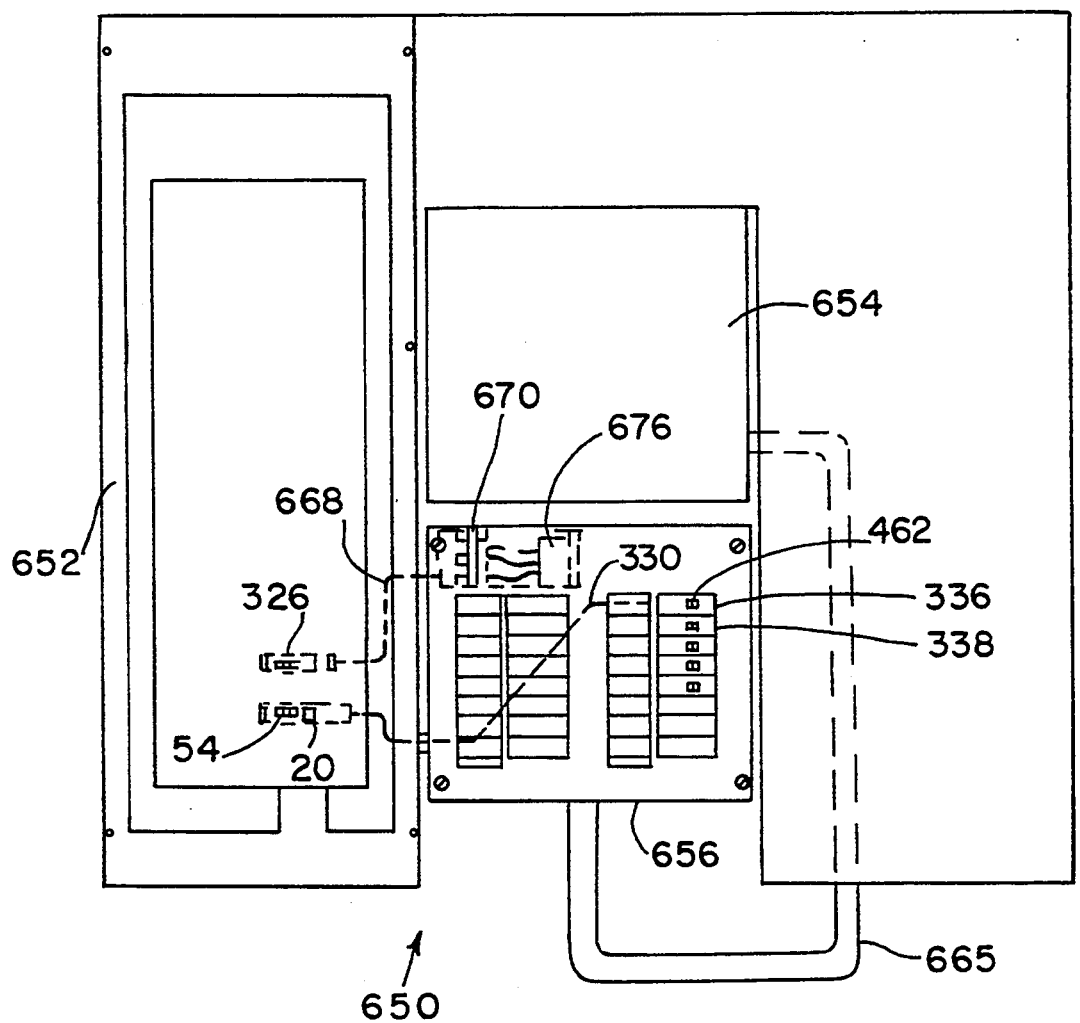
FIG. 28 is a front view of a service center embodying the invention.
Figure 29:
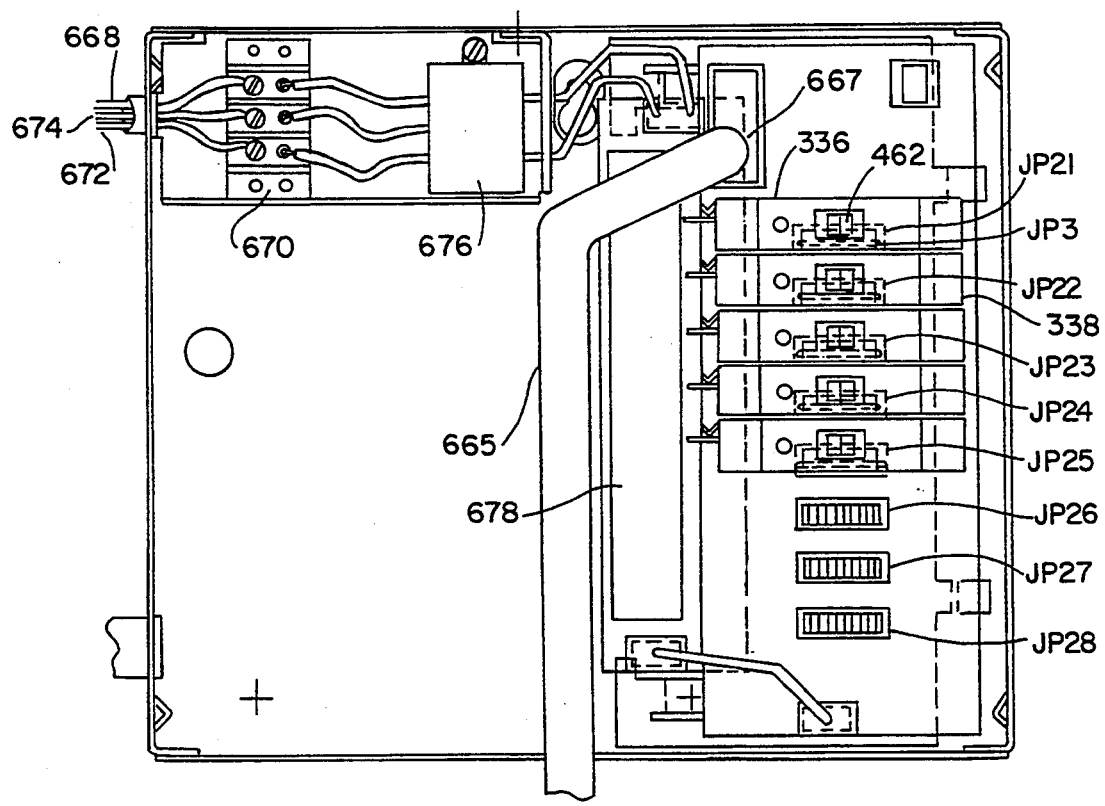
FIG. 29 is a front view of a portion of the structure of FIG. 28.
Figure 30:
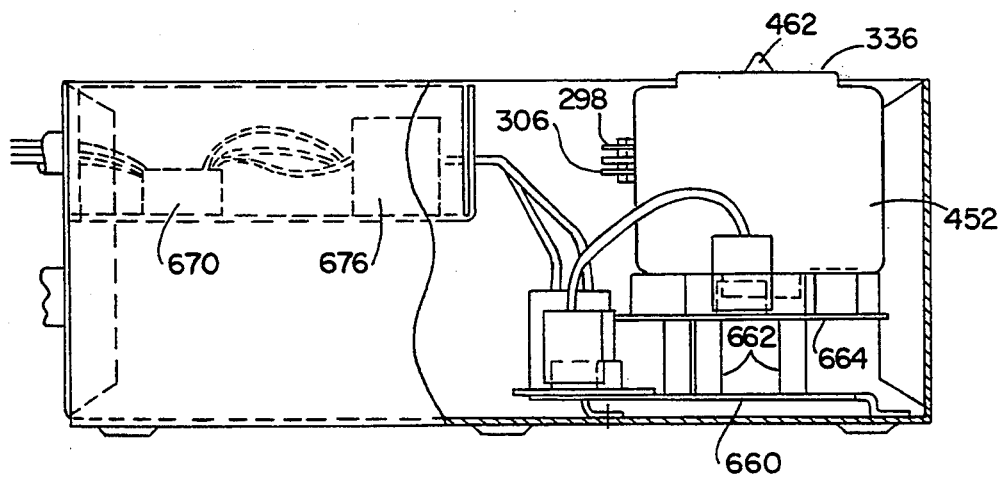
FIG. 30 is a side view of a portion of the structure of FIG. 29.

FIG. 28 shows a service center 650 including a circuit breaker panelboard 652, a system controller panel 654, and a pole controller panel 656. Other areas of the service center are reserved for various functions including a cable raceway, coaxial headend, telephone gateway, and applications controller, as designated by the host system for the home automation system. Circuit breaker panelboard 652 houses a plurality of circuit breakers in standard manner, including circuit breakers such as 326, and remote control circuit breakers such as 20. The system controller panel 654 receives the host system controller such as the aforementioned SMART HOUSE system controller 350. The pole controller panel 656 includes a recessed, back mounting plate 660, FIG. 30, having forwardly extending stand-offs 662 for mounting a motherboard printed circuit board 664 containing the circuitry of FIGS. 15 and 16, and which may include some of the SMART HOUSE system controller circuitry such as the Branch Slave Chip and the Appliance Chip as above described. A communications cable 665 extends between system controller panel 654 and pole controller panel 656 having plug-in connection to the motherboard 664 at header 667. The motherboard includes eight connection headers JP21 through JP28, FIGS. 29 and 15, into which the respective pole controllers are plugged. For example, pole controller 336 at JP3 connector 368 is plugged into header JP21. FIGS. 28 and 29 show five pole controllers 336, 3218, etc., each plugged into a respective one of the connection headers. The system may be expanded or contracted as desired to use or leave unused the slots for pole controllers.

Each pole controller has an output connector, as shown at 494, FIGS. 21 and 22, having connection conductor prongs 298 and 306 supplying the control signal current to solenoid 188, FIG. 13, and a third unused prong 666, FIG. 22. The control signal on line 330, FIGS. 14 and 28, lines 298 and 306, FIG. 13, is provided to solenoid 188 in remote control circuit breaker 20, as above described. One of the circuit breakers, such as 326, is used to supply current to and protect the control circuitry and the power supply therefore. Circuit breaker 326 supplies current on line 668 to connection header 670, FIG. 29, which also has a connection to neutral 672 and ground 674. The AC voltage is filtered by AC line filter 676, provided by a Curtis Industries 11508806 filter, and then routed to a power supply 678, provided by a Lambda Co. model VS50 power supply, which supplies the noted voltages $V_{cc}$ and $V_{ss}$ for the control circuitry. In the disclosed embodiment, $V_{cc}$ is 5 volts DC, and $V_{ss}$ is 24 volts DC.

Pole controllers such as 336, 338, etc., plug into pole controller panel 656 simply by plugging JP3 connector 368, FIG. 22, into JP21 header connection 366, JP4 into JP22, etc. Handle 462 of manual override switch 460 in pole controller 336 is user friendly and presents a similar visual appearance to the user as circuit breaker handle 54, and is in a similar environment as the circuit breaker handle to enhance the user's comfort level and familiarity with the new equipment. The pole controllers such as 336, 338, etc. plug in to the respective headers JP21, JP22, etc. in modular fashion, enabling a simple modular type building block system and complete user flexibility in choosing the number of branch load circuits to be remotely controlled. For each branch load circuit to be remotely controlled, a remote control circuit breaker 20 is installed in panelboard 652, or a standard circuit breaker such as 326 is removed and replaced by a remote control circuit breaker 20, and a pole controller 336 is installed therefor. Each pole controller may control one or more remote control branch circuit breakers and/or plural poles may be provided by plural pole circuit breakers.

It is recognized that various equivalents, alternatives and modifications are possible within the scope of the appended claims. In alternative embodiments, a microprocessor may be used, with random addressing and accessing of pole controllers according to availability or opportunity, followed by status indication.

We claim:

1. A remote control circuit breaker system comprising a plurality of remote control circuit breakers each including a switch responsive to a control signal for controllably completing and interrupting a respective load circuit, a plurality of pole controllers each responsive to an address signal and coupled to a respective circuit breaker and supplying said control signal to said switch, each pole controller including a status circuit responsive to actuation of said switch and supplying a status signal indicative thereof, a common controller coupled to said pole controllers and supplying said address signals, said status signal is generated after generation of said address confirming actuation of said switch in response to said control signal from said pole controller responding to said address signal, said common controller generates a sequence cycle comprising an address cycle comprising a plurality of multiplexed address signals, followed by a status cycle comprising a plurality of multiplexed status signals, such that status cycles are provided between address cycles, said status cycle begins upon completion of said address cycle, and wherein upon completion of said status cycle, the next address cycle begins, said common controller comprises a timer generating a first high frequency clock signal, a counter counting said clock signals and dividing same to provide a plurality of different lower frequency clock signals, a group of said lower frequency clock signals providing address selection signals for said multiplexed address signals, a logic gating circuit logically combining said first high frequency clock signal and one of said lower frequency clock signals and providing said address cycle and said status cycle, such that said address cycle and said status cycle are both generated by said common controller, said logic gating circuit comprises a first gate enabled by said one lower frequency clock signal during a first interval and passing said first high frequency clock signal therethrough during said first interval, and a second gate enabled by said one lower frequency clock signal during a second interval and passing said first high frequency clock signal therethrough during said second interval, said first gate being disabled during said second interval to block passage of said first high frequency clock signal therethrough, said second gate being disabled during said first interval to block passage of said first high frequency clock signal therethrough, said first and second intervals sequentially following each other in alternating relation, said first interval providing said address cycle, said second interval providing said status cycle.

2. A remote control circuit breaker system comprising a plurality of remote control circuit breakers each including a switch responsive to a control signal for controllably completing and interrupting a respective load circuit, a plurality of pole controllers each responsive to an address signal and coupled to a respective circuit breaker and supplying said control signal to said switch, each pole controller including a status circuit responsive to actuation of said switch and supplying a status signal indicative thereof, a common controller coupled to said pole controllers and supplying said address signals, wherein said status circuit responds to a given current characteristic of said control signal supplied from said pole controller to said switch in response to said address signal, to indicate actuation of said switch and the condition of said load circuit, said given current characteristic is a given current versus time profile, said given current characteristic comprises an increase in current value of said control signal to a first level followed by a decrease in current value of said control signal to a second lower level within a given time interval, each pole controller comprises current sensing circuitry sensing control signal current and outputting a fault signal if control signal current fails to decrease from said first level to said second lower level within said given time interval.

3. The remote control circuit breaker system according to claim 2 wherein each pole controller comprises a first monitor circuit monitoring said control signal current and outputting a signal having a first state when said control signal current is at said first level, and a second state when said control signal current decreases to said second level, and a second monitor circuit monitoring the output of said first monitor circuit, said second monitor circuit including a timer responsive to said first state of said output signal from said first monitor circuit to begin a timing interval, and responsive to said second state of said output signal from said first monitor circuit to terminate said timing interval, said second monitor circuit outputting said fault signal if the duration between initiation and termination of said timing interval by said timer is greater than said given time interval.

4. The remote control circuit breaker system according to claim 2 wherein said current sensing circuit provides a $V_{detect}$ voltage proportional to control signal current, and comprising a first comparator comparing $V_{detect}$ against a first threshold comparison voltage and outputting a signal to a timing capacitor when $V_{detect}$ rises above said first threshold comparison voltage, to begin charging said timing capacitor, a second comparator comparing the voltage across said timing capacitor against a second threshold comparison voltage and outputting said fault signal if said voltage across said timing capacitor rises above said second threshold comparison voltage.

5. The remote control circuit breaker system according to claim 4 wherein said timing capacitor discharges when $V_{detect}$ decreases below said first threshold comparison voltage.

6. The remote control circuit breaker system according to claim 4 comprising a discharge circuit connected to said timing capacitor and providing a discharge current path therefor when said address signal is in a given state.

7. The remote control circuit breaker system according to claim 4 comprising a third comparator comparing $V_{detect}$ against a third threshold comparison voltage and outputting a pre-status signal as $V_{detect}$ initially rises above a third threshold comparison voltage nominally above zero.

8. The remote control circuit breaker system according to claim 7 comprising a logic gate combining said fault and said pre-status signals and providing an output status signal having a first state responsive to said pre-status signal, said first state providing a preliminary indication that said switch in said remote control circuit breaker should be open and said load circuit should be interrupted, wherein said logic gate changes its output status signal from said first state to a second state in response to said fault signal, said second state of said logic gate output status signal indicating that said switch in said remote control circuit breaker has remained closed and that said load circuit has not been interrupted, such that said fault signal overrides said pre-status signal and changes said output status signal of said logic gate from said first state to said second state.

9. A remote control circuit breaker system comprising a plurality of remote control circuit breakers each including a switch responsive to a control signal for controllably completing and interrupting a respective load circuit, a plurality of pole controllers each responsive to an address signal and coupled to a respective circuit breaker and supplying said control signal to said switch, each pole controller including a status circuit responsive to actuation of said switch and supplying a status signal indicative thereof, a common controller coupled to said pole controllers and supplying said address signals, wherein said pole controller comprises a manual override switch having a first position overriding said common controller and providing a control signal interrupting said load circuit regardless of the address signal provided by said common controller to the respective said pole controller, a second position enabling said control signal to be controlled by said common controller, and a third position overriding said common controller and allowing completion of said load circuit regardless of any address signal provided by said common controller to the respective said pole controller.

10. The remote control circuit breaker system according to claim 9 comprising a dual color lamp system comprising first and second colors, and lamp energizing circuitry responsive to said manual override switch and to said common controller and energizing said lamp system such that said first color is flashingly illuminated when said manual override switch is in said first position, said second color is flashingly illuminated when said manual override switch is in said third position, said first color is continuously illuminated when said manual override switch is in said second position and said load circuit is interrupted, said second color is continuously illuminated when said manual override switch is in said second position and completion of said load circuit is allowed.

11. The remote control circuit breaker system according to claim 10 wherein said status circuit supplies a fault signal when said first mentioned switch fails to actuate in response to said control signal from said respective pole controller, and wherein said lamp energizing circuit responds to said fault signal and alternately flashes said first and second colors.

12. The remote control circuit breaker system according to claim 11 comprising a first lamp switch for illuminating said first color, a second lamp switch for illuminating said second color, a source of clock signals for providing flashing illumination, a logic gating circuit responsive to said manual override switch and said common controller for actuating said first and second lamp switches and gating said clock signals therethrough to flashingly illuminate said colors.

13. The remote control circuit breaker system according to claim 12 wherein said common controller generates a sequence cycle comprising an address cycle comprising a plurality of multiplexed address signals, followed by a status cycle comprising a plurality of multiplexed status signals, such that status cycles are provided between address cycles, wherein said status cycle begins upon completion of said address cycle, and wherein upon completion of said status cycle, the next address cycle begins, said common controller comprises a timer generating a first high frequency clock signal, a counter counting clock pulses of said high frequency clock signal and dividing same to provide a plurality of different lower frequency clock signals, a group of said lower frequency clock signals providing address selection signals for said multiplexed address signals, a logic gating circuit logically combining said first high frequency clock signal and one of said lower frequency clock signals and providing said address cycle and said status cycle, such that said address cycle and said status cycle are generated by said common controller, said lower frequency clock signals being supplied to said pole controller to provide said clock signals for flashing illumination.

14. The remote control circuit breaker system according to claim 12 comprising a first node coupled to said first lamp switch and coupled through an inverter to said second lamp switch such that when said first lamp switch is on, said second lamp switch is off, and such that when said first lamp switch is off, said second lamp switch is on, a first gate enabled by a fault condition of said fault status signal and passing a first of said clock signals therethrough to said first node, said first clock signal alternating between first and second states at a given frequency, such that during said first state, said first lamp switch is on and said second lamp switch is off, and during said second state, said first lamp switch is off and said second lamp switch is on, said first gate being disabled by a nonfault condition of said fault status signal to block passage of said first clock signal therethrough, said first node being coupled to said manual override switch, a second gate responsive to said manual override switch and to a second of said clock signals having a higher frequency than said first clock signal, a third gate responsive to said fault status signal and to said second clock signal, the outputs of said second and third gates being connected to a second node controlling flashing and continuous illumination of said colors according to the state of said second node.

15. The remote control circuit breaker system according to claim 12 comprising a first logic gating circuit having a first input from said status circuit and a second input from a first of said clock signals, and an output combined with an output of said manual override switch and supplied to said first and second lamp switches, a second logic gating circuit having a first input from said status circuit, a second input from said manual override switch, and a third input from a second of said clock signals of different frequency than said first clock signal, and an output to said lamp system.

16. The remote control circuit breaker system according to claim 15 wherein said first clock signal is twice the frequency of said second clock signal, and such that in response to said fault status signal when said switch in said remote control circuit breaker fails to actuate in response to said control signal from said respective pole controller, said first color flashes on during a first half cycle of said first clock signal, then off during the next half cycle of said first clock signal, all during a half cycle of said second clock signal, whereafter said second color flashes on during the first half cycle of the next cycle of said first clock, and then off during the second half cycle of said next cycle of said first clock, all during the next half cycle of said second clock, such that during a full cycle of said second clock, said first color is on, then both colors are off, then said second color is on, then both colors are off.

17. The remote control circuit breaker system according to claim 9 wherein said status circuit responds to a given current characteristic of said control signal current supplied from said pole controller to said switch in response to said address signal, to indicate actuation of said switch and the condition of said load circuit, said given current characteristic comprising a given current versus time profile comprising an increase in current value of said control signal to a first level followed by a decrease in current value of said control signal to a second lower level within a given time interval, said pole controller comprising current sensing circuitry providing a $V_{detect}$ voltage proportional to control signal current, and comprising a first comparator comparing $V_{detect}$ against a first threshold comparison voltage and outputting a signal to a timing capacitor when $V_{detect}$ rises above said first threshold comparison voltage, to begin charging said timing capacitor, a second comparator comparing the voltage across said timing capacitor against a second threshold comparison voltage and outputting a fault signal if said voltage across said timing capacitor rises above said second threshold comparison voltage, a discharge circuit connected between said timing capacitor and said manual override switch and providing a discharge current path for said timing capacitor when said manual override switch is in said second position and said address signal is at a given state, and also providing a discharge current path for said timing capacitor when said manual override switch is in said third position.

18. A remote control circuit breaker system comprising a plurality of remote control circuit breakers each including a switch responsive to a control signal for controllably completing and interrupting a respective load circuit, a plurality of pole controllers each responsive to an address signal and coupled to a respective circuit breaker and supplying said control signal to said switch, a common controller coupled to said pole controllers and supplying said address signals, each pole controller including a current sensing circuit sensing the current supplied to said switch and terminating current flow to said switch in response to an overcurrent condition, to protect said switch, wherein said overcurrent condition is a given current versus time profile of control signal current, said pole controller comprises a timer responsive to said current sensing circuit and outputting a fault signal if said control signal current rises above a given level and remains thereabove for a given interval, and a cut-out switch responsive to said fault signal and terminating control signal current flow to said switch of said remote control circuit breaker, said current sensing circuit provides a Vdetect voltage proportional to control signal current flowing to said switch of said remote control circuit breaker, and comprising a control switch responsive to said address signal to supply said control signal to said switch of said remote control circuit breaker, a first comparator comparing $V_{detect}$ against a first threshold comparison voltage and outputting a signal to a timing capacitor when $V_{detect}$ rises above said first threshold comparison voltage, to begin charging said timing capacitor, a second comparator comparing the voltage across said timing capacitor against a second threshold comparison voltage and outputting said fault signal to said cut-out switch if said voltage across said timing capacitor rises above said second threshold comparison voltage.

19. A remote control circuit breaker system comprising a service center receiving electrical utility power, said service center having a circuit breaker panel section, a plurality of circuit breakers, including remote control circuit breakers, mounted in said circuit breaker panel section, each circuit breaker having a user engageable handle extending forwardly toward and facing the user, each remote control circuit breaker including a switch responsive to a control signal for controllably completing and interrupting a respective load circuit, said service center having a pole controller panel section, a motherboard printed circuit board mounted in said pole controller panel section and having common controller circuitry and a plurality of connection headers thereon, said common controller circuitry supplying address signals through said connection headers, a plurality of pole controllers in said pole controller panel section, each pole controller mounted on said motherboard in plugged-in relation with a respective said connection headers, each pole controller having a user engageable handle extending forwardly toward and facing the user, each pole controller responsive to a respective said address signal and coupled to a respective said remote control circuit breaker and supplying said control signal to said switch, wherein each said pole controller comprises an insulating case having a connection port with a motherboard interface connector mating with a respective said connection header on said motherboard, said case having an opening at the front facing the user, and wherein said pole controller comprises a manual override switch mounted in said case, said pole controller handle being part of said manual override switch and extending forwardly therefrom through said front opening in said case, said manual override switch is a three position switch, with said pole controller handle having a first position overriding said common controller and providing a control signal interrupting said load circuit regardless of any address signal provided by said common controller to the respective said pole controller, a second position enabling said control signal to be controlled by said common controller, and a third position overriding said common controller and allowing completion of said load circuit regardless of any address signal provided by said common controller to the respective said pole controller.

20. The remote control circuit breaker system according to claim 19 wherein said case has a second opening at the front facing the user, and wherein said pole controller comprises a lamp system including a lamp in said case at said second opening and visible therethrough, and lamp energizing circuitry responsive to said manual override switch and to said common controller for illuminating said lamp.

* * * * *

UNITED STATES PATENT AND TRADEMARK OFFICE
CERTIFICATE OF CORRECTION

PATENT NO. : 5,373,411
DATED : December 13, 1994
INVENTOR(S) : William E. Grass, et al It is certified that error appears in the above-indentified patent and that said Letters Patent is hereby corrected as shown below:

IN THE CLAIMS

CLAIM 1
Col. 28, Line 30
(Claim 6, Line 12

After "address" insert -- signal, for --

CLAIM 6
Col. 29, Line 61
(Claim 15, Line 2

Delete "4" and substitute therefor -- 5 --

CLAIM 18
Col. 32, Line 65
(Claim 32, Line 20

Delete "Vdetect" and substitute therefor -- $V_{detect}$ --

CLAIM 19
Col. 33, Line 31
(Claim 35, Line 18

Delete "headers" and substitute therefor -- header --.

Signed and Sealed this

Twenty-eight Day of March, 1995

Attest:

BRUCE LEHMAN

Attesting Officer          Commissioner of Patents and Trademarks